US012798787B2

(12) United States Patent
Subramaniyan et al.

(10) Patent No.: US 12,798,787 B2
(45) Date of Patent: Nov. 17, 2026

(54) SYSTEMS, APPARATUSES, METHODS, AND COMPUTER PROGRAM PRODUCTS FOR INITIATING PERFORMANCE OF ONE OR MORE AVIATION RELATED ACTIONS

(71) Applicant: Honeywell International Inc., Charlotte, NC (US)

(72) Inventors: Muthusankar Subramaniyan, Madurai (IN); Sivakumar Kanagarajan, Bangalore (IN); Gobinathan Baladhandapani, Madurai (IN); Srilakshmi Kurudi, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 78 days.

(21) Appl. No.: 18/933,402

(22) Filed: Oct. 31, 2024

(65) Prior Publication Data

US 2026/0015101 A1 Jan. 15, 2026

(30) Foreign Application Priority Data

Jul. 12, 2024 (IN) ............................. 202411053392

(51) Int. Cl.
*B64D 45/00* (2006.01)

(52) U.S. Cl.
CPC .................................... *B64D 45/00* (2013.01)

(58) Field of Classification Search
CPC ................................ B64D 45/00; B64D 43/00
See application file for complete search history.

(56) References Cited

U.S. PATENT DOCUMENTS

| | | | | |
|---|---|---|---|---|
| 6,408,259 | B1 * | 6/2002 | Goebel | G07C 3/00 702/182 |
| 8,290,643 | B2 * | 10/2012 | Chen | G01C 23/00 701/14 |
| 8,756,012 | B2 * | 6/2014 | He | G08G 5/21 701/527 |
| 9,233,763 | B1 * | 1/2016 | Chen | G07C 5/0808 |
| 9,934,693 | B2 * | 4/2018 | Joyson | G06Q 10/06 |
| 9,972,143 | B1 * | 5/2018 | Garai | G07C 5/12 |
| 12,131,650 | B2 * | 10/2024 | Eberhardt, III | G08G 5/26 |
| 2015/0348422 | A1 * | 12/2015 | Agrawal | G06Q 10/06 701/120 |

(Continued)

*Primary Examiner* — Mussa A Shaawat
(74) *Attorney, Agent, or Firm* — Alston & Bird LLP

(57) ABSTRACT

Systems, apparatuses, methods, and computer program products are provided herein. For example, a method may include connecting to an external aviation turnaround device. In some embodiments, the method includes receiving external aviation turnaround data from the external aviation turnaround device. In some embodiments, the method includes identifying aircraft aviation turnaround data associated with an aircraft. In some embodiments, the method includes broadcasting the aircraft aviation turnaround data to the external aviation turnaround device. In some embodiments, the method includes generating revised aviation operations data by applying the external aviation turnaround data or the aircraft aviation turnaround data to an aviation performance engine. In some embodiments, the method includes initiating performance of one or more aviation related actions based on the revised aviation operations data.

20 Claims, 11 Drawing Sheets

(56) References Cited

U.S. PATENT DOCUMENTS

| | | | | |
|---|---|---|---|---|
| 2015/0355832 | A1* | 12/2015 | Dostal | G08G 5/53 715/771 |
| 2016/0049019 | A1* | 2/2016 | Mahalingaiah | H04B 7/18506 701/33.4 |
| 2016/0083118 | A1* | 3/2016 | Mahalingaiah | G07C 5/008 701/32.1 |
| 2016/0105326 | A1* | 4/2016 | Smart | H04L 41/0873 370/242 |
| 2016/0340058 | A1* | 11/2016 | Da Silva | G01M 5/0066 |
| 2017/0323274 | A1* | 11/2017 | Johnson | G05B 13/041 |
| 2018/0016034 | A1* | 1/2018 | Joyson | G06Q 10/0633 |
| 2019/0090800 | A1* | 3/2019 | Bosworth | A61B 5/0015 |
| 2019/0266814 | A1* | 8/2019 | Huang | G06F 3/0482 |
| 2020/0027378 | A1* | 1/2020 | Castet | G06T 15/04 |
| 2020/0047914 | A1* | 2/2020 | Martin | G07C 5/085 |
| 2020/0180790 | A1* | 6/2020 | Ramaswamy | G08G 5/21 |
| 2020/0184830 | A1* | 6/2020 | Samuthirapandian | G08G 5/21 |
| 2020/0320884 | A1* | 10/2020 | Hillier | G06F 11/1641 |
| 2021/0110731 | A1* | 4/2021 | Shamasundar | B64D 45/00 |
| 2022/0063833 | A1* | 3/2022 | Misenheimer | G08G 5/21 |
| 2023/0035814 | A1* | 2/2023 | Borgyos | G08G 5/55 |
| 2023/0177966 | A1* | 6/2023 | Janakiraman | G08G 5/30 701/3 |
| 2023/0368676 | A1* | 11/2023 | Saccone | G08G 5/26 |

* cited by examiner

SYSTEMS, APPARATUSES, METHODS, AND COMPUTER PROGRAM PRODUCTS FOR INITIATING PERFORMANCE OF ONE OR MORE AVIATION RELATED ACTIONS

CROSS REFERENCE TO RELATED APPLICATIONS

This application claims the benefit of India Provisional Patent Application No. 202411053392, filed Jul. 12, 2024, the entire contents of which are incorporated by reference herein.

TECHNOLOGICAL FIELD

Embodiments of the present disclosure relate generally to systems, apparatuses, methods, and computer program products for initiating performance of one or more aviation related actions.

BACKGROUND

Applicant has identified many technical challenges and difficulties associated with systems, apparatuses, methods, and computer program products for initiating performance of one or more aviation related actions. Through applied effort, ingenuity, and innovation, Applicant has solved problems related to systems, apparatuses, methods, and computer program products for initiating performance of one or more aviation related actions by developing solutions embodied in the present disclosure, which are described in detail below.

BRIEF SUMMARY

Various embodiments described herein relate to systems, apparatuses, methods, and computer program products for initiating performance of one or more aviation related actions.

In accordance with an aspect of the disclosure, a method is provided. In some embodiments, the method includes connecting to an external aviation turnaround device. In some embodiments, the method includes receiving external aviation turnaround data from the external aviation turnaround device. In some embodiments, the method includes identifying aircraft aviation turnaround data associated with an aircraft. In some embodiments, the method includes broadcasting the aircraft aviation turnaround data to the external aviation turnaround device. In some embodiments, the method includes generating revised aviation operations data by applying the external aviation turnaround data or the aircraft aviation turnaround data to an aviation performance engine. In some embodiments, the method includes initiating performance of one or more aviation related actions based on the revised aviation operations data.

In some embodiments, the external aviation turnaround device is configured to access the external aviation turnaround data from one or more aviation related data sources physically located at an airport.

In some embodiments, connecting to the external aviation turnaround device is performed using a bidirectional communication channel.

In some embodiments, the aircraft aviation turnaround data is broadcast using an aircraft secure interface device.

In some embodiments, the method includes detecting initiation of an aircraft mission associated with the aircraft.

In some embodiments, the method includes disconnecting from the external aviation turnaround device in response to detecting the initiation of the aircraft mission.

In some embodiments, the external aviation turnaround data is received in real-time and the aircraft aviation turnaround data is broadcast in real-time.

In some embodiments, the method includes generating an aircraft control interface component.

In some embodiments, the aircraft control interface component comprises one or more aircraft control display items.

In some embodiments, the method includes detecting a selection of at least one of the one or more aircraft control display items.

In some embodiments, the method includes disconnecting from the external aviation turnaround device in response to detecting the selection of the at least one of the one or more aircraft control display items.

In some embodiments, the method includes generating an airport interface component based on airport data.

In some embodiments, the airport interface component comprises one or more airport display items.

In some embodiments, the method includes generating an operator designated time interface component based on operator designated time data.

In some embodiments, the operator designated time interface component comprises one or more operator designated time display items.

In some embodiments, the method includes generating an aviation turnaround interface component based on the external aviation turnaround data, the aircraft aviation turnaround data, or actual aviation turnaround data.

In some embodiments, the aviation turnaround interface component comprises one or more external aviation turnaround display items, aircraft aviation turnaround display items, or actual aviation turnaround display items.

In some embodiments, the method includes generating an aviation operations interface component based on aviation operations data.

In some embodiments, the aviation operations interface component comprises one or more aviation operations display items.

In some embodiments, initiating performance of one or more aviation related actions includes modifying an aviation operations interface component.

In some embodiments, initiating performance of one or more aviation related actions includes causing operation of at least one of one or more aircraft components of the aircraft.

In some embodiments, initiating performance of one or more aviation related actions includes causing initiation of an aircraft mission associated with the aircraft.

In accordance with another aspect of the disclosure, an apparatus is provided. In some embodiments, the apparatus includes memory and one or more processors communicatively coupled to the memory. In some embodiments, the one or more processors are configured to connect to an external aviation turnaround device. In some embodiments, the one or more processors are configured to receive external aviation turnaround data from the external aviation turnaround device. In some embodiments, the one or more processors are configured to identify aircraft aviation turnaround data associated with an aircraft. In some embodiments, the one or more processors are configured to broadcast the aircraft aviation turnaround data to the external aviation turnaround device. In some embodiments, the one or more processors are configured to generate revised aviation operations data by applying the external aviation turnaround data or the aircraft aviation turnaround data to an aviation performance engine. In some embodiments, the one or more processors are configured to initiate performance of one or more aviation related actions based on the revised aviation operations data.

In some embodiments, the external aviation turnaround device is configured to access the external aviation turnaround data from one or more aviation related data sources physically located at an airport.

In some embodiments, the one or more processors are further configured to detect initiation of an aircraft mission associated with the aircraft.

In some embodiments, the one or more processors are further configured to disconnect from the external aviation turnaround device in response to detecting the initiation of the aircraft mission.

In some embodiments, the external aviation turnaround data is received in real-time and the aircraft aviation turnaround data is broadcast in real-time.

In accordance with another aspect of the disclosure, a computer program product is provided. In some embodiments, the computer program product includes at least one non-transitory computer-readable storage medium having computer program code stored thereon. In some embodiments, the computer program code, in execution with at least one processor, configures the computer program product for connecting to an external aviation turnaround device. In some embodiments, the computer program code, in execution with at least one processor, configures the computer program product for receiving external aviation turnaround data from the external aviation turnaround device. In some embodiments, the computer program code, in execution with at least one processor, configures the computer program product for identifying aircraft aviation turnaround data associated with an aircraft. In some embodiments, the computer program code, in execution with at least one processor, configures the computer program product for broadcasting the aircraft aviation turnaround data to the external aviation turnaround device. In some embodiments, the computer program code, in execution with at least one processor, configures the computer program product for generating revised aviation operations data by applying the external aviation turnaround data or the aircraft aviation turnaround data to an aviation performance engine. In some embodiments, the computer program code, in execution with at least one processor, configures the computer program product for initiating performance of one or more aviation related actions based on the revised aviation operations data.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
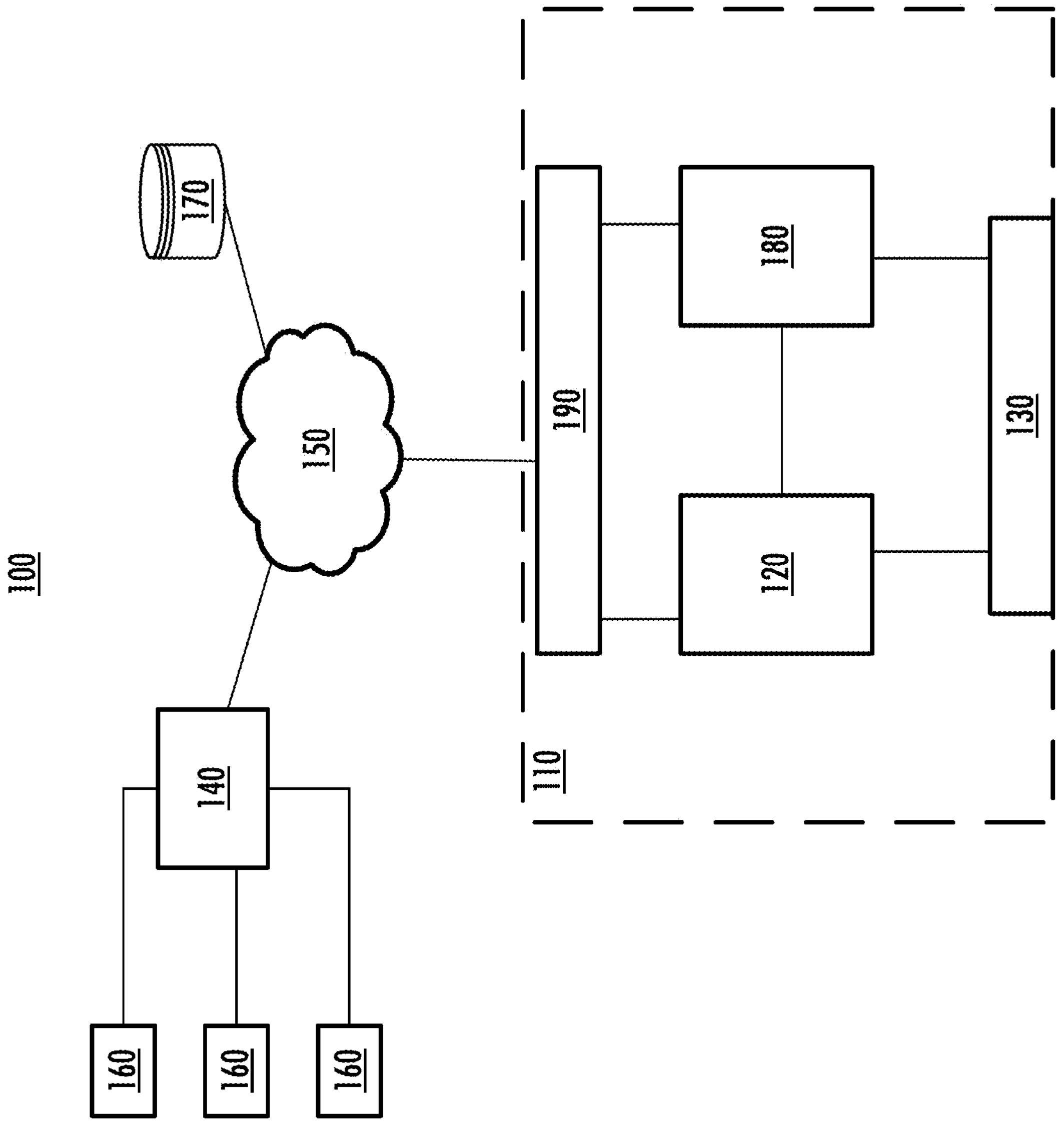
FIG. 1 illustrates an example block diagram of an environment in which embodiments of the present disclosure may operate.

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively, or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

Overview

Example embodiments disclosed herein address technical problems associated with initiating performance of one or more aviation related actions. As would be understood by one skilled in the field to which this disclosure pertains, there are numerous example scenarios in which it may be desirable to initiate performance of one or more aviation related actions.

In many applications, systems, apparatuses, methods, and computer program products for initiating performance of one or more aviation related actions are desirable. In some embodiments, it may be desirable to initiate performance of one or more aviation related actions using an onboard aviation turnaround device (e.g., a flight management system) and/or a mobile aviation turnaround device (e.g., an electronic flight bag). In some implementations, it may be desirable to initiate performance of one or more aviation related actions based on revised aviation operations data. For example, it may be desirable to initiate performance of one or more aviation related actions based on revised aviation operations data that has been generated by applying external aviation turnaround data and/or aircraft external aviation turnaround data to an aircraft performance engine. In this way, a wide variety of aviation related actions may be dynamically initiated by an optimized device based on aviation turnaround data.

Example solutions for initiating performance of one or more aviation related actions include using a computing device to initiate performance of one or more aviation related actions. However, such example, solutions are unreliable, suffer from high latency, are cumbersome, and are simplistic. For example, such example solutions are unreliable because such example solutions do not initiate performance of one or more aviation related actions based on revised aviation operations data generated using external aviation turnaround data and/or aircraft aviation turnaround data. In this way, such example solutions are not able to accurately implement an optimized aviation related action. As another example, such example solutions suffer from high latency because such example solutions do not leverage aircraft aviation turnaround data and/or external aviation turnaround data that is indicative of real-time conditions associated with an aircraft and/or an airport. As another example, such example solutions are cumbersome because such example solutions do not enable dynamically initiating performance of one or more aviation related actions using a mobile aviation turnaround device and/or an onboard aviation turnaround device. For example, such example solutions do not use particularly configured devices for initiating one or more aviation related actions. As another example, such example solutions are simplistic because they do not enable initiating performance of a wide variety of aviation related actions. For example, such example solutions do not enable initiating performance of one or more aviation related actions that include modifying an aviation operations interface component, causing operation of one or more aircraft components of an aircraft, and/or causing initiation of an aircraft mission associated with an aircraft. Accordingly, there is a need for systems, apparatuses, methods, and computer program products that are capable of initiating performance of one or more aviation related actions in a reliable, low latency, efficient, and sophisticated manner.

Thus, to address these and/or other issues related to such example solutions, example systems, apparatuses, methods, and computer program products for initiating performance of one or more aviation related actions are disclosed herein. For example, an embodiment in this disclosure, described in greater detail below, includes a method that includes receiving external aviation turnaround data from the external aviation turnaround device. In some embodiments, the method includes identifying aircraft aviation turnaround data associated with an aircraft. In some embodiments, the method includes broadcasting the aircraft aviation turnaround data to the external aviation turnaround device. In some embodiments, the method includes generating revised aviation operations data by applying the external aviation turnaround data or the aircraft aviation turnaround data to an aviation performance engine. In some embodiments, the method includes initiating performance of one or more aviation related actions based on the revised aviation operations data. Accordingly, the systems, apparatuses, methods, and computer program products disclosed herein enable initiating performance of one or more aviation related actions in a reliable, low latency, efficient, and sophisticated manner.

Example Systems and Apparatuses

Embodiments of the present disclosure herein include systems, apparatuses, methods, and computer program products configured for initiating performance of one or more aviation related actions. It should be readily appreciated that the embodiments of the apparatus, systems, methods, and computer program product described herein may be configured in various additional and alternative manners in addition to those expressly described herein.

FIG. 1 illustrates an example block diagram of an environment 100 in which embodiments of the present disclosure may operate. Specifically, FIG. 1 illustrates an aircraft 110. In some embodiments, the aircraft 110 may describe any machine, robot, computing devices, and/or apparatus comprised of hardware, software, firmware, and/or any combination thereof, that maneuvers throughout an environment through a medium, such as air. In some contexts, the aircraft 110 is utilized to transport objects, entities (e.g., people, animals, or other beings), and/or other onboard cargo. In some situations, the aircraft 110 may be transporting no object except for the aircraft itself. Examples of the aircraft 110 include airplanes, helicopters, drones, and/or the like. In some embodiments, the aircraft 110 is not limited to the examples listed herein and may include other types of transportation device.

In some embodiments, the aircraft 110 is configured to perform an aircraft mission. In some embodiments, an aircraft mission is a defined series of operations performed by the aircraft 110. For example, may include a defined series of operations performed by the aircraft 110 to move from a first airport to a second airport. In this regard, in some embodiments, an aircraft mission may include a defined series of operations performed by the aircraft 110 that include operations performed while the aircraft 110 is performing preflight procedures, (e.g., at the gate before a flight), leaving a gate, taxiing, taking off, in flight, landing, parking at a gate performing post flight procedures (e.g., at the gate after a flight), and/or the like. For example, an aircraft mission may include a defined series of operations that includes leaving the gate at a first airport, taxiing to a runway at the first airport (e.g., an originating airport), taking off from the first airport, flying to a second airport (e.g., a destination airport), landing at the second airport, taxiing to a gate at the second airport, parking at a gate at the second airport.

In some embodiments, the aircraft 110 is associated with a determinable location. The determinable location of the aircraft 110 in some embodiments represents an absolute position (e.g., GPS coordinates, latitude and longitude locations, an address, and/or the like) or a relative position of the aircraft 110 (e.g., an identifier representing the location of the aircraft 110 as compared to one or more other aircraft, one or more buildings (e.g., an airport), an enterprise headquarters, or general description in the world for example based at least in part on continent, state, ocean, or other definable region). In some embodiments, the aircraft 110 includes or otherwise is associated with a location sensor and/or software-driven location services that provide the location data corresponding to the aircraft 110. In other embodiments, the location of the aircraft 110 is stored and/or otherwise determinable to one or more systems.

In some embodiments, the environment 100 includes one or more aviation related data sources 160. In some embodiments, the one or more aviation related data sources 160 are communicatively coupled to an external aviation turnaround device 140, the aircraft 110, a mobile aviation turnaround device 120, an onboard aviation turnaround device 180, an aircraft secure interface device 190, one or more aircraft components 130, and/or one or more databases 170. In some embodiments, the one or more aviation related data sources 160 are physically located at an airport. In some embodiments, the one or more aviation related data sources 160 are configured to store, provide, and/or generate data. For example, the one or more aviation related data sources 160 are configured to store, generate, and/or provide external aviation turnaround data. In some embodiments, at least one of the one or more aviation related data sources 160 is associated with an air traffic control (ATC). In this regard, for example, an air traffic control may be configured to store, generate, and/or provide external aviation turnaround data. In some embodiments, at least one of the one or more aviation related data sources 160 is associated with an airport operation control center (AOCC). In this regard, for example, an airport operation control center may be configured to store, generate, and/or provide external aviation turnaround data. In some embodiments, at least one of the one or more aviation related data sources 160 is associated with a ground handler. In this regard, for example, a ground handler may be configured to store, generate, and/or provide external aviation turnaround data.

In some embodiments, the environment 100 includes an external aviation turnaround device 140. In some embodiments, the external aviation turnaround device 140 is electronically and/or communicatively coupled to the aircraft 110, the mobile aviation turnaround device 120, the onboard aviation turnaround device 180, the aircraft secure interface device 190, the one or more aircraft components 130, the one or more aviation related data sources 160, and/or the one or more databases 170. The external aviation turnaround device 140 may be located remotely from the aircraft 110. In this regard, for example, the external aviation turnaround device 140 may be located in a remote cloud server and electronically and/or communicatively coupled to the aircraft 110, the mobile aviation turnaround device 120, the onboard aviation turnaround device 180, the aircraft secure interface device 190, the one or more aircraft components 130, the one or more aviation related data sources 160, and/or the one or more databases 170 via at least the network 150. Additionally, or alternatively, the external aviation turnaround device 140 is physically located at an airport. In some embodiments, the external aviation turnaround device 140 comprises an airport collaborative decision-making (ACDM) device, such as an ACDM server. Additionally, or alternatively, the external aviation turnaround device 140 comprises a surface collaborative decision making (SCDM) device, such as an SCDM server. In some embodiments, the external aviation turnaround device 140 is a device that is separate from an ACDM device and/or an SCDM device. In some embodiments, the external aviation turnaround device 140 is configured via hardware, software, firmware, and/or a combination thereof, to perform data intake of one or more types of data, such as external aviation turnaround data, aircraft aviation turnaround data, actual aviation turnaround data, aircraft operations data, airport data, aviation operations data, revised aviation operations data, and/or the like.

Additionally, or alternatively, in some embodiments, the external aviation turnaround device 140 is configured via hardware, software, firmware, and/or a combination thereof, to generate and/or transmit command(s) that control, adjust, or otherwise impact operations of one or more of the aircraft 110, the mobile aviation turnaround device 120, the onboard aviation turnaround device 180, the aircraft secure interface device 190, the one or more aircraft components 130, the one or more aviation related data sources 160, and/or the one or more databases 170. For example, the external aviation turnaround device 140 may be configured to initiate performance of one or more aviation related actions. Additionally, or alternatively, in some embodiments, the external aviation turnaround device 140 is configured via hardware, software, firmware, and/or a combination thereof, to perform data reporting, provide data, and/or other data output process(es) associated with monitoring or otherwise analyzing operations of one or more of the aircraft 110, the mobile aviation turnaround device 120, the onboard aviation turnaround device 180, the aircraft secure interface device 190, the one or more aircraft components 130, the one or more aviation related data sources 160, and/or the one or more databases 170. For example, in various embodiments, the external aviation turnaround device 140 may be configured to execute and/or perform one or more operations and/or functions described herein.

In some embodiments, the environment 100 includes the mobile aviation turnaround device 120. In some embodiments, the mobile aviation turnaround device 120 is electronically and/or communicatively coupled to the aircraft

110, the external aviation turnaround device 140, the onboard aviation turnaround device 180, the aircraft secure interface device 190, the one or more aircraft components 130, the one or more aviation related data sources 160, and/or the one or more databases 170. The mobile aviation turnaround device 120 may be located remotely from the aircraft 110, in proximity of the aircraft 110 (e.g., with a pilot at an airport gate associated with the aircraft 110), and/or within the aircraft 110 (e.g., with the pilot in the aircraft 110). In this regard, for example, the mobile aviation turnaround device 120 may be portable. In some embodiments, the mobile aviation turnaround device 120 is an electronic flight bag. In some embodiments, the mobile aviation turnaround device 120 is configured via hardware, software, firmware, and/or a combination thereof, to perform data intake of one or more types of data, such as external aviation turnaround data, aircraft aviation turnaround data, actual aviation turnaround data, aircraft operations data, airport data, aviation operations data, revised aviation operations data, and/or the like.

Additionally, or alternatively, in some embodiments, the mobile aviation turnaround device 120 is configured via hardware, software, firmware, and/or a combination thereof, to generate and/or transmit command(s) that control, adjust, or otherwise impact operations of one or more of the aircraft 110, the external aviation turnaround device 140, the onboard aviation turnaround device 180, the aircraft secure interface device 190, the one or more aircraft components 130, the one or more aviation related data sources 160, and/or the one or more databases 170. For example, the mobile aviation turnaround device 120 may be configured to initiate performance of one or more aviation related actions. Additionally, or alternatively, in some embodiments, the mobile aviation turnaround device 120 is configured via hardware, software, firmware, and/or a combination thereof, to perform data reporting, provide data, and/or other data output process(es) associated with monitoring or otherwise analyzing operations of one or more of the aircraft 110, the external aviation turnaround device 140, the onboard aviation turnaround device 180, the aircraft secure interface device 190, the one or more aircraft components 130, the one or more aviation related data sources 160, and/or the one or more databases 170. For example, in various embodiments, the mobile aviation turnaround device 120 may be configured to execute and/or perform one or more operations and/or functions described herein.

In some embodiments, the environment 100 includes the onboard aviation turnaround device 180. In some embodiments, the onboard aviation turnaround device 180 is electronically and/or communicatively coupled to the aircraft 110, the external aviation turnaround device 140, the mobile aviation turnaround device 120, the aircraft secure interface device 190, the one or more aircraft components 130, the one or more aviation related data sources 160, and/or the one or more databases 170. The onboard aviation turnaround device 180 may be located within the aircraft 110. In some embodiments, the onboard aviation turnaround device 180 is a flight management system (FMS). For example, the onboard aviation turnaround device 180 may be a connected flight management system (CFMS). In some embodiments, the onboard aviation turnaround device 180 is configured via hardware, software, firmware, and/or a combination thereof, to perform data intake of one or more types of data, such as external aviation turnaround data, aircraft aviation turnaround data, actual aviation turnaround data, aircraft operations data, airport data, aviation operations data, revised aviation operations data, and/or the like.

Additionally, or alternatively, in some embodiments, the onboard aviation turnaround device 180 is configured via hardware, software, firmware, and/or a combination thereof, to generate and/or transmit command(s) that control, adjust, or otherwise impact operations of one or more of the aircraft 110, the external aviation turnaround device 140, the mobile aviation turnaround device 120, the aircraft secure interface device 190, the one or more aircraft components 130, the one or more aviation related data sources 160, and/or the one or more databases 170. For example, the onboard aviation turnaround device 180 may be configured to initiate performance of one or more aviation related actions. Additionally, or alternatively, in some embodiments, the onboard aviation turnaround device 180 is configured via hardware, software, firmware, and/or a combination thereof, to perform data reporting, provide data, and/or other data output process(es) associated with monitoring or otherwise analyzing operations of one or more of the aircraft 110, the external aviation turnaround device 140, the mobile aviation turnaround device 120, the aircraft secure interface device 190, the one or more aircraft components 130, the one or more aviation related data sources 160, and/or the one or more databases 170. For example, in various embodiments, the onboard aviation turnaround device 180 may be configured to execute and/or perform one or more operations and/or functions described herein.

In some embodiments, the environment 100 includes the one or more aircraft components 130. In some embodiments, the one or more aircraft components 130 are electronically and/or communicatively coupled to the aircraft 110, the external aviation turnaround device 140, the mobile aviation turnaround device 120, the aircraft secure interface device 190, the one or more aviation related data sources 160, the onboard aviation turnaround device 180, and/or the one or more databases 170. The one or more aircraft components 130 may be located within the aircraft 110. In this regard, for example may be one or more individual components of the aircraft 110 that perform a particular function during operation of the aircraft 110. For example, the one or more aircraft components 130 may include one or more of multi-function control and display units (MCDU), flight management systems (FMS) (e.g., a secondary flight management system when the onboard aviation turnaround device 180 is a flight management system), inertial reference systems (IRS), global positioning systems (GPS), sensors, actuators, primary flight displays, radars (e.g., weather radars), engines, auxiliary power units (APU), enhanced ground proximity warning systems (EGPWS), landing gear, flaps, power stations, ailerons, autopilot systems, empennages, and/or the like. In this regard, for example, the individual components of the aircraft 110 may include components associated with a particular process or operation performed by the aircraft 110. In some embodiments, the one or more aircraft components 130 are physically secured to the aircraft 110. In some embodiments, the one or more aircraft components 130 include the onboard aviation turnaround device 180. In some embodiments, the one or more aircraft components 130 are configured via hardware, software, firmware, and/or a combination thereof, to perform data intake of one or more types of data, such as external aviation turnaround data, aircraft aviation turnaround data, actual aviation turnaround data, aircraft operations data, airport data, aviation operations data, revised aviation operations data, and/or the like.

Additionally, or alternatively, in some embodiments, the one or more aircraft components 130 are configured via hardware, software, firmware, and/or a combination thereof, to generate and/or transmit command(s) that control, adjust, or otherwise impact operations of one or more of the aircraft 110, the external aviation turnaround device 140, the mobile aviation turnaround device 120, the aircraft secure interface device 190, the one or more aviation related data sources 160, the onboard aviation turnaround device 180, and/or the one or more databases 170. For example, the one or more aircraft components 130 may be configured to determine aviation mission impacts. Additionally, or alternatively, in some embodiments, the one or more aircraft components 130 are configured via hardware, software, firmware, and/or a combination thereof, to perform data reporting, provide data, and/or other data output process(es) associated with monitoring or otherwise analyzing operations of one or more of the aircraft 110, the external aviation turnaround device 140, the mobile aviation turnaround device 120, the aircraft secure interface device 190, the one or more aviation related data sources 160, the onboard aviation turnaround device 180, and/or the one or more databases 170. For example, in various embodiments, the one or more aircraft components 130 may be configured to execute and/or perform one or more operations and/or functions described herein.

In some embodiments, the environment 100 includes one or more databases 170. The one or more databases 170 may be configured to receive, store, and/or transmit data. For example, the one or more databases 170 may be configured to receive, store, and/or transmit data associated with the aircraft 110, the external aviation turnaround device 140, the mobile aviation turnaround device 120, the aircraft secure interface device 190, the one or more aircraft components 130, the one or more aviation related data sources 160, and/or the onboard aviation turnaround device 180. In this regard, for example, the one or more databases 170 may be configured to receive, store, and/or transmit external aviation turnaround data, aircraft aviation turnaround data, actual aviation turnaround data, aircraft operations data, airport data, aviation operations data, revised aviation operations data, and/or the like. The one or more databases 170 may be located remotely from the aircraft 110, in proximity of the aircraft 110, and/or within the aircraft 110.

In some embodiments, the environment 100 includes an aircraft secure interface device 190. In some embodiments, the aircraft secure interface device 190 is electronically and/or communicatively coupled to the aircraft 110, the external aviation turnaround device 140, the mobile aviation turnaround device 120, the onboard aviation turnaround device 180, the one or more aviation related data sources 160, the one or more aircraft components 130, and/or the one or more databases 170. In some embodiments, the aircraft secure interface device 190 is configured to securely facilitate communication between the aircraft 110, the external aviation turnaround device 140, the mobile aviation turnaround device 120, the onboard aviation turnaround device 180, the one or more aircraft components 130, the one or more aviation related data sources 160, and/or the one or more databases 170. In some embodiments, the aircraft secure interface device 190 is physically located on the aircraft 110. In this regard, for example, the aircraft secure interface device 190 may be configured to prevent the aircraft 110 and/or components of the aircraft from being compromised by malicious actors.

The network 150 may be embodied in any of a myriad of network configurations. In some embodiments, the network 150 may be a public network (e.g., the Internet). In some embodiments, the network 150 may be a private network (e.g., an internal localized, or closed-off network between particular devices). In some other embodiments, the network 150 may be a hybrid network (e.g., a network enabling internal communications between particular connected devices and external communications with other devices). In various embodiments, the network 150 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 150. Such configuration(s) include, without limitation, a wired or wireless Personal Area Network (PAN), Local Area Network (LAN), Metropolitan Area Network (MAN), Wide Area Network (WAN), and/or the like.

Additionally, while FIG. 1 illustrates certain components as separate, standalone entities communicating over the network 150, various embodiments are not limited to this configuration. In other embodiments, one or more components may be directly connected and/or share hardware or the like. For example, in some embodiments, the external aviation turnaround device 140 may include the one or more databases 170.

Figure 2:
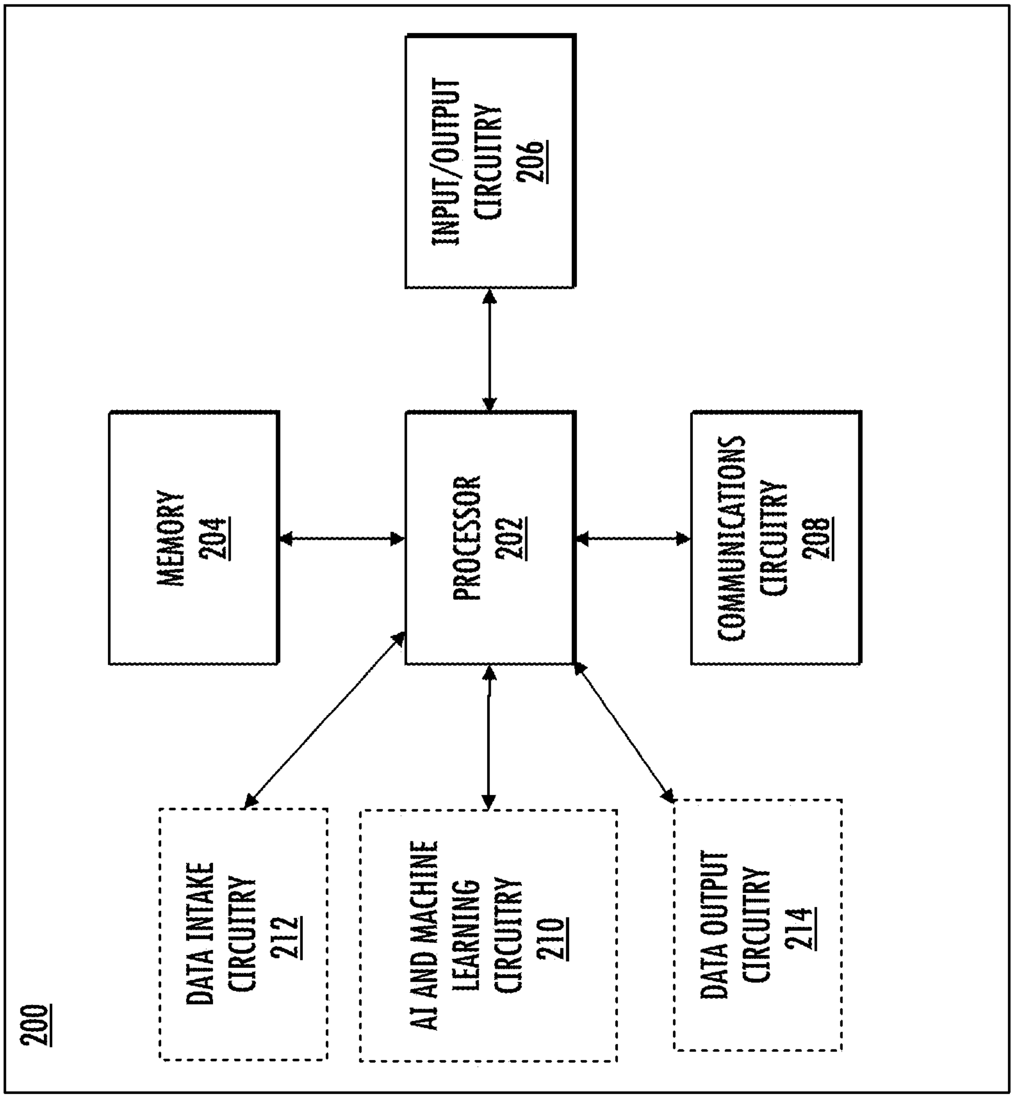
FIG. 2 illustrates an example block diagram of an example apparatus that may be specially configured in accordance with an example embodiment of the present disclosure.

FIG. 2 illustrates an example block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud-based computing apparatus, a specifically configured embedded computing device (e.g., configured for edge computing, and/or the like). Examples of an apparatus 200 may include, but is not limited to, the external aviation turnaround device 140, the mobile aviation turnaround device 120, the aircraft secure interface device 190, the one or more aircraft components 130, the one or more aviation related data sources 160, the one or more databases 170, and/or the onboard aviation turnaround device 180. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of the external aviation turnaround device 140, the mobile aviation turnaround device 120, the aircraft secure interface device 190, the one or more aircraft components 130, the one or more aviation related data sources 160, the one or more databases 170, and/or the onboard aviation turnaround device 180 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally, or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device, one or more sensors, and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data associated with operations of the aircraft 110. In some embodiments, the data intake circuitry 212 includes hardware, software, firmware, and/or a combination thereof, that communicates with one or more sensor(s) component(s), and/or the like within the aircraft 110 to receive particular data associated with such operations of the aircraft 110. Additionally, or alternatively, in some embodiments, the data intake circuitry 212 includes hardware, software, firmware, and/or a combination thereof, that retrieves particular data associated with the aircraft 110 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, data structures, control signals, and electronic information for training and executing a trained AI and machine learning model configured for facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally, or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally, or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally, or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally, or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect to the AI and machine learning circuitry 210.

In some embodiments, the external aviation turnaround device 140 is configured to access external aviation turnaround data. In some embodiments, external aviation turnaround data includes one or more items of data representative and/or indicative of a target turnaround process for the aircraft 110 that is stored, generated, and/or provided by the one or more aviation related data sources 160 and/or the external aviation turnaround device 140. For example, external aviation turnaround data may include one or more items of data representative and/or indicative of a target start up approval time (TSAT) for the aircraft 110 that is stored, generated, and/or provided by the one or more aviation related data sources 160 and/or the external aviation turnaround device 140. As another example, external aviation turnaround data may include one or more items of data representative and/or indicative of a target off block time (TOBT) for the aircraft 110 that is stored, generated, and/or provided by the one or more aviation related data sources 160 and/or the external aviation turnaround device 140.

As another example, external aviation turnaround data may include one or more items of data representative and/or indicative of a target taxi out time (TXOT) for the aircraft 110 that is stored, generated, and/or provided by the one or more aviation related data sources 160 and/or the external aviation turnaround device 140. As another example, external aviation turnaround data may include one or more items of data representative and/or indicative of a target take off time (TTOT) for the aircraft 110 that is stored, generated, and/or provided by the one or more aviation related data sources 160 and/or the external aviation turnaround device 140. Said differently, in some embodiments, external aviation turnaround data includes one or more items of data representative and/or indicative of the aircraft 110 target out of gate time, the aircraft 110 target wheels off the runway time, the aircraft 110 target wheels on the runway time, and/or the aircraft 110 target in the gate time (e.g., target OOOI data associated with the aircraft 110) that is stored, generated, and/or provided by the one or more aviation related data sources 160 and/or the external aviation turnaround device 140.

In some embodiments, the external aviation turnaround device 140 is configured to access external aviation turnaround data from at least one of the one or more aviation related data sources 160. In this regard, for example, the external aviation turnaround device 140 is configured to access external aviation turnaround data from an air traffic control (ATC). As another example, the external aviation turnaround device 140 is configured to access external aviation turnaround data from an airport operation control center (AOCC). As another example, the external aviation turnaround device 140 is configured to access external aviation turnaround data from a ground handler. In some embodiments, external aviation turnaround data is real-time data. In this regard, for example, external aviation turnaround data may be representative and/or indicative of a target turnaround process for the aircraft 110 that is currently predicted and/or targeted.

In some embodiments, the external aviation turnaround device 140 is configured to process the external aviation turnaround data. In this regard, for example, processing the external aviation turnaround data may include performing interpolation on the external aviation turnaround data. As another example, processing the external aviation turnaround data may include verifying the accuracy of the external aviation turnaround data. As another example, processing the external aviation turnaround data may include labeling the external aviation turnaround data.

In some embodiments, the mobile aviation turnaround device 120 and/or the onboard aviation turnaround device 180 is configured to connect to the external aviation turnaround device 140. In some embodiments, the mobile aviation turnaround device 120 and/or the onboard aviation turnaround device 180 is configured to connect to the external aviation turnaround device 140 when the aircraft 110 is at a gate at an airport. For example, the mobile aviation turnaround device 120 and/or the onboard aviation turnaround device 180 may be configured to connect to the external aviation turnaround device 140 when the aircraft 110 arrives at a gate after a flight (e.g., after an aircraft mission).

In some embodiments, connecting to the external aviation turnaround device 140 is performed using a communication channel. In some embodiments, the communication channel is an electronic communication medium through which data may be transmitted. In some embodiments, the communication channel is a bidirectional communication channel. In this regard, for example, the communication channel enables the external aviation turnaround device 140, the mobile aviation turnaround device 120, and/or the onboard aviation turnaround device 180 to send and receive data between each other. In some embodiments, using the communication channel to connect to the external aviation turnaround device 140 is facilitated by the aircraft secure interface device 190. In this regard, for example, the communication channel may be a secure communication channel. In some embodiments, the aircraft secure interface device 190 is configured to facilitate a handshake between the mobile aviation turnaround device 120 and the external aviation turnaround device 140. Additionally, or alternatively, the aircraft secure interface device 190 is configured to facilitate a handshake between the onboard aviation turnaround device 180 and the external aviation turnaround device 140.

In some embodiments, the mobile aviation turnaround device 120 and/or the onboard aviation turnaround device 180 is configured to receive external aviation turnaround data. In some embodiments, external aviation turnaround data may be received by the mobile aviation turnaround device 120 and/or the onboard aviation turnaround device 180 from the external aviation turnaround device 140. For example, external aviation turnaround data may be received by the mobile aviation turnaround device 120 and/or the onboard aviation turnaround device 180 via the communication channel. In some embodiments, external aviation turnaround data is received in response to a query by the mobile aviation turnaround device 120 and/or the onboard aviation turnaround device 180. In some embodiments, the mobile aviation turnaround device 120 and/or the onboard aviation turnaround device 180 is configured to query for external aviation turnaround data periodically. For example, the mobile aviation turnaround device 120 and/or the onboard aviation turnaround device 180 may be configured to query for external aviation turnaround data once a minute. In some embodiments, the mobile aviation turnaround device 120 and/or the onboard aviation turnaround device 180 is configured to receive external aviation turnaround data in real-time.

In some embodiments, the mobile aviation turnaround device 120 and/or the onboard aviation turnaround device 180 is configured to identify aircraft aviation turnaround data. In some embodiments, aircraft aviation turnaround data includes one or more items of data representative and/or indicative of a target turnaround process for the aircraft 110 that is stored, generated, and/or provided by one or more devices by the mobile aviation turnaround device 120 and/or the onboard aviation turnaround device 180. For example, aircraft aviation turnaround data may include one or more items of data representative and/or indicative of a target start up approval time (TSAT) for the aircraft 110 that is stored, generated, and/or provided by the mobile aviation turnaround device 120 and/or the onboard aviation turnaround device 180. As another example, aircraft aviation turnaround data may include one or more items of data representative and/or indicative of a target off block time (TOBT) for the aircraft 110 that is stored, generated, and/or provided by the mobile aviation turnaround device 120 and/or the onboard aviation turnaround device 180.

As another example, aircraft aviation turnaround data may include one or more items of data representative and/or indicative of a target taxi out time (TXOT) for the aircraft 110 that is stored, generated, and/or provided by the mobile aviation turnaround device 120 and/or the onboard aviation turnaround device 180. As another example, aircraft aviation turnaround data may include one or more items of data representative and/or indicative of a target take off time (TTOT) for the aircraft 110 that is stored, generated, and/or provided by the mobile aviation turnaround device 120 and/or the onboard aviation turnaround device 180. Said differently, in some embodiments, aircraft aviation turnaround data includes one or more items of data representative and/or indicative of the aircraft 110 target out of gate time, the aircraft 110 target wheels off the runway time, the aircraft 110 target wheels on the runway time, and/or the aircraft 110 target in the gate time (e.g., target OOOI data associated with the aircraft 110) that is stored, generated, and/or provided by the mobile aviation turnaround device 120 and/or the onboard aviation turnaround device 180.

In some embodiments, identifying aircraft aviation turnaround data includes the mobile aviation turnaround device 120 and/or the onboard aviation turnaround device 180 being configured to receive aircraft aviation turnaround data via an aviation turnaround interface component 500. For example, a pilot associated with the aircraft 110 may provide aircraft aviation turnaround data to the mobile aviation turnaround device 120 and/or the onboard aviation turnaround device 180 via the aviation turnaround interface component 500. In some embodiments, identifying aircraft aviation turnaround data includes the mobile aviation turnaround device 120 and/or the onboard aviation turnaround device 180 being configured to generate aircraft aviation turnaround data. In some embodiments, the mobile aviation turnaround device 120 and/or the onboard aviation turnaround device 180 is configured to generate aircraft aviation turnaround data using at least one of the one or more aircraft components 130. For example, the mobile aviation turnaround device 120 and/or the onboard aviation turnaround device 180 may be configured to generate aircraft aviation turnaround data using an inertial reference system, radar, actuators, global positioning systems, and/or the like.

In some embodiments, the mobile aviation turnaround device 120 and/or the onboard aviation turnaround device 180 is configured to broadcast aircraft aviation turnaround data. In some embodiments, the mobile aviation turnaround device 120 and/or the onboard aviation turnaround device 180 is configured to broadcast aircraft aviation turnaround data to the external aviation turnaround device 140 and/or the one or more aviation related data sources 160. In some embodiments, the mobile aviation turnaround device 120 and/or the onboard aviation turnaround device 180 is configured to broadcast aircraft aviation turnaround data using the communication channel. In some embodiments, the aircraft secure interface device 190 is configured to facilitate broadcasting of aircraft aviation turnaround data by the mobile aviation turnaround device 120 and/or the onboard aviation turnaround device 180. In some embodiments, the mobile aviation turnaround device 120 and/or the onboard aviation turnaround device 180 is configured to broadcast aircraft aviation turnaround data when at an airport (e.g., at a gate of the airport). For example, the mobile aviation turnaround device 120 and/or the onboard aviation turnaround device 180 may be configured to broadcast aircraft aviation turnaround data after the aircraft 110 has completed a flight and is preparing for another flight (e.g., after an aircraft has completed an aircraft mission and is preparing for another aircraft mission). In some embodiments, the mobile aviation turnaround device 120 and/or the onboard aviation turnaround device 180 is configured to broadcast aircraft aviation turnaround data in real-time.

In some embodiments, the mobile aviation turnaround device 120 and/or the onboard aviation turnaround device 180 is configured to identify actual aviation turnaround data. In some embodiments, actual aviation turnaround data includes one or more items of data representative and/or indicative of an actual turnaround process for the aircraft 110. For example, actual aviation turnaround data may include one or more items of data representative and/or indicative of an actual start up approval time (ASAT) of the aircraft 110. As another example, actual aviation turnaround data may include one or more items of data representative and/or indicative of an actual off block time (AOBT) of the aircraft 110. As another example, actual aviation turnaround data may include one or more items of data representative and/or indicative of an actual taxi out time (AXOT) of the aircraft 110. As another example, actual aviation turnaround data may include one or more items of data representative and/or indicative of an actual take off time (ATOT) of the aircraft 110. Said differently, in some embodiments, actual aviation turnaround data includes one or more items of data representative and/or indicative of the aircraft 110 actual out of gate time, the aircraft 110 actual wheels off the runway time, the aircraft 110 actual wheels on the runway time, and/or the aircraft 110 actual in the gate time (e.g., actual OOOI data).

In some embodiments, identifying actual aviation turnaround data includes the mobile aviation turnaround device 120 and/or the onboard aviation turnaround device 180 being configured to receive actual aviation turnaround data from the external aviation turnaround device 140. For example, the external aviation turnaround device 140 may be configured to determine actual off block time (AOBT) of the aircraft 110 and provide the actual off block time (AOBT) of the aircraft 110 to the mobile aviation turnaround device 120 and/or the onboard aviation turnaround device 180. In some embodiments, identifying actual aviation turnaround data includes the mobile aviation turnaround device 120 and/or the onboard aviation turnaround device 180 being configured to generate actual aviation turnaround data. In some embodiments, the mobile aviation turnaround device 120 and/or the onboard aviation turnaround device 180 is configured to generate actual aviation turnaround data using at least one of the one or more aircraft components 130. For example, the mobile aviation turnaround device 120 and/or the onboard aviation turnaround device 180 may be configured to determine an actual taxi out time (AXOT) of the aircraft 110 using the one or more aircraft components 130.

In some embodiments, the mobile aviation turnaround device 120 and/or the onboard aviation turnaround device 180 is configured to identify airport data. In some embodiments, airport data includes one or more items of data representative and/or indicative of an airport associated with the aircraft 110 (e.g., an airport the aircraft 110 is located at, traveling to, etc.). For example, airport data may include one or more items of data representative and/or indicative of a name of an airport associated with the aircraft 110. As another example, airport data may include one or more items of data representative and/or indicative of an airport code of an airport associated with the aircraft 110 (e.g., LFPG). As another example, airport data may include one or more items of data representative and/or indicative of a time at an airport associated with the aircraft 110 (e.g., 10:00). As another example, airport data may include one or more items of data representative and/or indicative of a time at an airport associated with the aircraft 110 relative to a standard time (e.g., UTC minus one hour). As another example, airport data may include one or more items of data representative and/or indicative of a gate designated for the aircraft 110 at an airport associated with the aircraft 110.

In some embodiments, identifying airport data includes the mobile aviation turnaround device 120 and/or the onboard aviation turnaround device 180 being configured to receive airport data from the external aviation turnaround device 140. For example, the external aviation turnaround device 140 may be configured to determine a gate designated for the aircraft 110 at an airport associated with the aircraft 110 provide information about the gate to the mobile aviation turnaround device 120 and/or the onboard aviation turnaround device 180. In some embodiments, identifying airport data includes the mobile aviation turnaround device 120 and/or the onboard aviation turnaround device 180 being configured to generate airport data. In some embodiments, the mobile aviation turnaround device 120 and/or the onboard aviation turnaround device 180 is configured to generate airport data using at least one of the one or more aircraft components 130. For example, the mobile aviation turnaround device 120 and/or the onboard aviation turnaround device 180 may be configured to determine a time at an airport associated with the aircraft 110 using the one or more aircraft components 130.

In some embodiments, the mobile aviation turnaround device 120 and/or the onboard aviation turnaround device 180 is configured to identify aviation operations data. In some embodiments, aviation operations data includes one or more items of data representative and/or indicative of one or more predicted parameters associated with an aircraft mission. For example, aviation operations data may include one or more items of data representative and/or indicative of a time of arrival at an airport (e.g., at a destination airport). As another example, aviation operations data may include one or more items of data representative and/or indicative of a block time associated with an aircraft mission. As another example, aviation operations data may include one or more items of data representative and/or indicative of a flight time associated with an aircraft mission. As another example, aviation operations data may include one or more items of data representative and/or indicative of an altitude at various points in an aircraft mission.

As another example, aviation operations data may include one or more items of data representative and/or indicative of a speed at various points in an aircraft mission. As another example, aviation operations data may include one or more items of data representative and/or indicative of fuel expenditure in an aircraft mission. As another example, aviation operations data may include one or more items of data representative and/or indicative of a distance to go associated with an aircraft mission. As another example, aviation operations data may include one or more items of data representative and/or indicative of a flight path associated with an aircraft mission. As another example, aviation operations data may include one or more items of data representative and/or indicative of a flight plan associated with an aircraft mission.

In some embodiments, identifying aviation operations data includes the mobile aviation turnaround device 120 and/or the onboard aviation turnaround device 180 being configured to receive aviation operations data from the external aviation turnaround device 140. For example, the external aviation turnaround device 140 may be configured to determine a flight path associated with an aircraft mission and provide the flight path to the mobile aviation turnaround device 120 and/or the onboard aviation turnaround device 180. In some embodiments, identifying aviation operations data includes the mobile aviation turnaround device 120 and/or the onboard aviation turnaround device 180 being configured to generate aviation operations data. In some embodiments, the mobile aviation turnaround device 120 and/or the onboard aviation turnaround device 180 is configured to generate aviation operations data using at least one of the one or more aircraft components 130. For example, the mobile aviation turnaround device 120 and/or the onboard aviation turnaround device 180 may be configured to determine a fuel expenditure associated with an aircraft mission using the one or more aircraft components 130.

In some embodiments, the mobile aviation turnaround device 120 and/or the onboard aviation turnaround device 180 is configured to receive operator designated time data. In some embodiments, the mobile aviation turnaround device 120 and/or the onboard aviation turnaround device 180 is configured to receive operator designated time data via an operator designated time interface component 600. In some embodiments, operator designated time data includes one or more items of data representative and/or indicative of one or more time parameters designated by an operator of the aircraft 110 (e.g., one or more time values designated by a pilot of the aircraft 110). For example, operator designated time data may include one or more items of data representative and/or indicative of a block time parameter designated by an operator of the aircraft 110. As another example, operator designated time data may include one or more items of data representative and/or indicative of a flight time parameter designated by an operator of the aircraft 110.

In some embodiments, the mobile aviation turnaround device 120 and/or the onboard aviation turnaround device 180 is configured to generate revised aviation operations data. In some embodiments, revised aviation operations data includes one or more items of data representative and/or indicative of one or more revised predicted parameters associated with an aircraft mission. For example, revised aviation operations data may include one or more items of data representative and/or indicative of a revised time of arrival at an airport (e.g., at a destination airport). As another example, revised aviation operations data may include one or more items of data representative and/or indicative of a revised block time associated with an aircraft mission. As another example, revised aviation operations data may include one or more items of data representative and/or indicative of a revised flight time associated with an aircraft mission. As another example, revised aviation operations data may include one or more items of data representative and/or indicative of a revised altitude at various points in an aircraft mission.

As another example, revised aviation operations data may include one or more items of data representative and/or indicative of a revised speed at various points in an aircraft mission. As another example, revised aviation operations data may include one or more items of data representative and/or indicative of a revised fuel expenditure in an aircraft mission. As another example, revised aviation operations data may include one or more items of data representative and/or indicative of a revised distance to go associated with an aircraft mission. As another example, revised aviation operations data may include one or more items of data representative and/or indicative of a revised flight path associated with an aircraft mission. As another example, revised aviation operations data may include one or more items of data representative and/or indicative of a revised flight plan associated with an aircraft mission.

In some embodiments, the mobile aviation turnaround device 120 and/or the onboard aviation turnaround device 180 is configured to generate revised aviation operations data by applying external aviation turnaround data to an aviation performance engine. In some embodiments, the aviation performance engine is a data entity that describes parameters, hyper-parameters, and/or defined operations of a rules-based and/or machine learning model that is configured to generate revised aviation operations data.

In some embodiments, if external aviation turnaround data indicates that a target start up approval time (TSAT) is later and/or earlier than a previous target start up approval time (TSAT), applying the external aviation turnaround data to the aviation performance engine may generate revised aviation operations data that factors in the change to the target start up approval time (TSAT). For example, revised aviation operation data may include a revised time of arrival at an airport (e.g., at a destination airport) due to the change to the target start up approval time (TSAT). In some embodiments, if external aviation turnaround data indicates that a target off block time (TOBT) is later and/or earlier than a previous target off block time (TOBT), applying the external aviation turnaround data to the aviation performance engine may generate revised aviation operations data that factors in the change to the target off block time (TOBT). For example, revised aviation operation data may include a revised fuel expenditure due to the change to the target off block time (TOBT).

In some embodiments, if external aviation turnaround data indicates that a target taxi out time (TXOT) is later and/or earlier than a previous target taxi out time (TXOT), applying the external aviation turnaround data to the aviation performance engine may generate revised aviation operations data that factors in the change to the target taxi out time (TXOT). For example, revised aviation operation data may include a revised flight path due to the change to the target taxi out time (TXOT). In some embodiments, if external aviation turnaround data indicates that a target take off time (TTOT) is later and/or earlier than a previous target take off time (TTOT), applying the external aviation turnaround data to the aviation performance engine may generate revised aviation operations data that factors in the change to the target take off time (TTOT). For example, revised aviation operation data may include a revised altitude at various points in an aircraft mission in due to the change to the target take off time (TTOT).

Additionally, or alternatively, in some embodiments, the mobile aviation turnaround device 120 and/or the onboard aviation turnaround device 180 is configured to generate revised aviation operations data by applying aircraft aviation turnaround data to an aviation performance engine. In this regard, in some embodiments, if aircraft aviation turnaround data indicates that a target start up approval time (TSAT) is later and/or earlier than a previous target start up approval time (TSAT), applying the aircraft aviation turnaround data to the aviation performance engine may generate revised aviation operations data that factors in the change to the target start up approval time (TSAT). For example, revised aviation operation data may include a revised time of arrival at an airport (e.g., at a destination airport) due to the change to the target start up approval time (TSAT). In some embodiments, if aircraft aviation turnaround data indicates that a target off block time (TOBT) is later and/or earlier than a previous target off block time (TOBT), applying the aircraft aviation turnaround data to the aviation performance engine may generate revised aviation operations data that factors in the change to the target off block time (TOBT). For example, revised aviation operation data may include a revised fuel expenditure due to the change to the target off block time (TOBT).

In some embodiments, if aircraft aviation turnaround data indicates that a target taxi out time (TXOT) is later and/or earlier than a previous target taxi out time (TXOT), applying the aircraft aviation turnaround data to the aviation performance engine may generate revised aviation operations data that factors in the change to the target taxi out time (TXOT). For example, revised aviation operation data may include a revised flight path due to the change to the target taxi out time (TXOT). In some embodiments, if aircraft aviation turnaround data indicates that a target take off time (TTOT) is later and/or earlier than a previous target take off time (TTOT), applying the aircraft aviation turnaround data to the aviation performance engine may generate revised aviation operations data that factors in the change to the target take off time (TTOT). For example, revised aviation operation data may include a revised altitude at various points in an aircraft mission in due to the change to the target take off time (TTOT).

Figure 3:
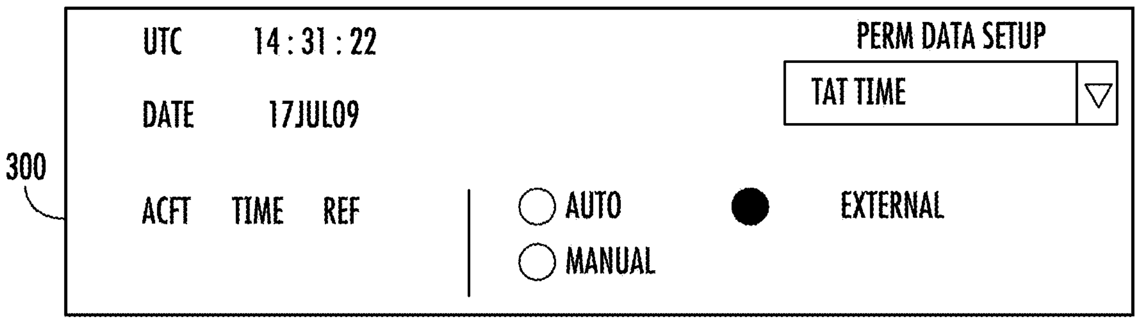
FIG. 3 illustrates an interface component in accordance with one or more embodiments of the present disclosure.

In some embodiments, the mobile aviation turnaround device 120 and/or the onboard aviation turnaround device 180 is configured to generate an aircraft control interface component 300, such as illustrated in FIG. 3. In some embodiments, the aircraft control interface component 300 includes one or more aircraft control display items. In some embodiments, an aircraft control display item is a display item that may be used to control one or more operations of the aircraft 110. For example, the aircraft control interface component 300 may include an aircraft control display item that is configured for automatically setting a time associated with the aircraft 110 when selected. As another example, the aircraft control interface component 300 may include an aircraft control display item that is configured to be used for manually setting a time associated with the aircraft 110 when selected (e.g., by an operator of the aircraft 110). As another example, the aircraft control interface component 300 may include an aircraft control display item that is configured for connecting and/or disconnecting from the external aviation turnaround device 140 (e.g., an aircraft control display item named external). In this regard, in some embodiments, the mobile aviation turnaround device 120 and/or the onboard aviation turnaround device 180 is configured to detect a selection of at least one of the one or more aircraft control display items and, in response to detection of the selection of the at least one of the one or more aircraft control display items connect to the external aviation turnaround device 140. Additionally, or alternatively, in response to detection of the selection of the at least one of the one or more aircraft control display items, the mobile aviation turnaround device 120 and/or the onboard aviation turnaround device 180 is configured to disconnect from to the external aviation turnaround device 140. In some embodiments, at least one of the one or more aircraft control display items is visually distinguished on the aircraft control interface component 300 when the mobile aviation turnaround device 120 and/or the onboard aviation turnaround device 180 is connected to the external aviation turnaround device 140. For example, at least one of the one or more aircraft control display items may be visually distinguished on the aircraft control interface component 300 using text, markings, colors, highlights, and/or the like (e.g., an aircraft control display item is green).

Figure 4:
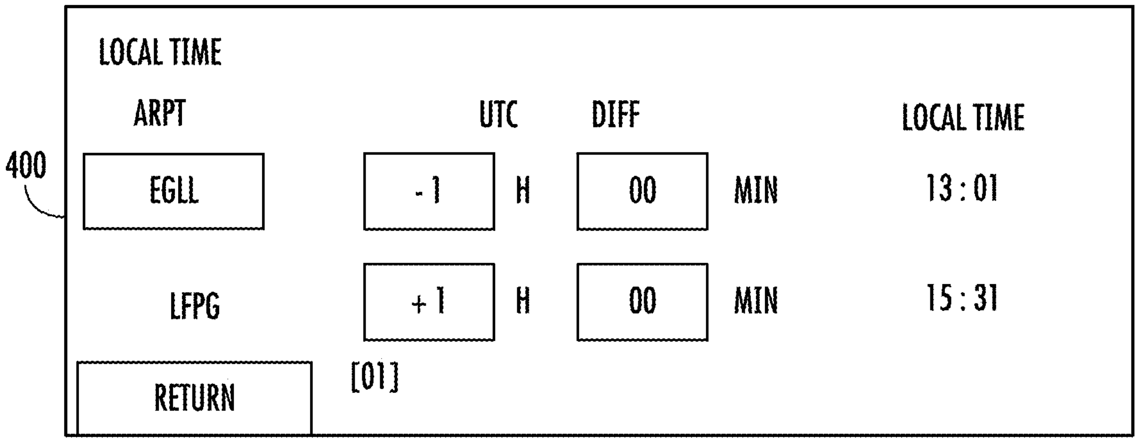
FIG. 4 illustrates an interface component in accordance with one or more embodiments of the present disclosure.

In some embodiments, the mobile aviation turnaround device 120 and/or the onboard aviation turnaround device 180 is configured to generate an airport interface component 400, such as illustrated in FIG. 4. In some embodiments, the airport interface component 400 is generated based on airport data. In this regard, in some embodiments, the airport interface component 400 includes one or more airport display items. In some embodiments, an airport display item is a display item that is representative of at least a portion of airport data. For example, an airport display item may be representative of an airport associated with the aircraft 110, an airport code of an airport associated with the aircraft 110, a time at an airport associated with the aircraft 110, a time at an airport associated with the aircraft relative to a standard time, and/or a gate designated for the aircraft 110 at an airport associated with the aircraft 110.

Figure 5:
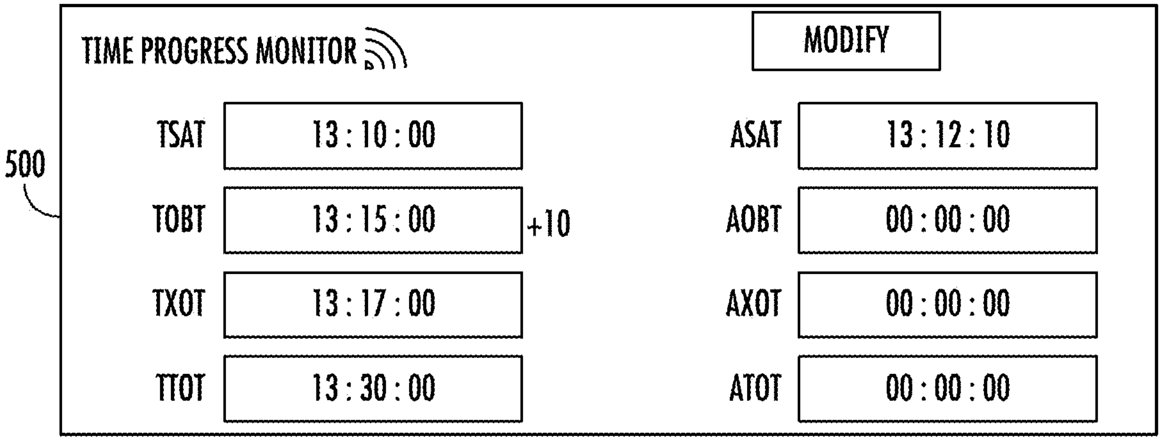
FIG. 5 illustrates an interface component in accordance with one or more embodiments of the present disclosure.

In some embodiments, the mobile aviation turnaround device 120 and/or the onboard aviation turnaround device 180 is configured to generate an aviation turnaround interface component 500, such as illustrated in FIG. 5. In some embodiments, the aviation turnaround interface component 500 is generated based on external aviation turnaround data. In this regard, in some embodiments, the aviation turnaround interface component 500 includes one or more external aviation turnaround display items. In some embodiments, an external aviation turnaround display item is a display item that is representative of at least a portion of external aviation turnaround data. For example, an external aviation turnround display item may be representative of a target start up approval time (TSAT), a target off block time (TOBT), a target taxi out time (TXOT), a target take off time (TTOT) for the aircraft 110 that is stored, generated, and/or provided by the one or more aviation related data sources 160 and/or the external aviation turnaround device 140.

In some embodiments, the aviation turnaround interface component 500 is generated based on aircraft aviation turnaround data. In this regard, in some embodiments, the aviation turnaround interface component 500 includes one or more aircraft aviation turnaround display items. In some embodiments, an aircraft aviation turnaround display item is a display item that is representative of at least a portion of aircraft aviation turnaround data. For example, an aircraft aviation turnround display item may be representative of a target start up approval time (TSAT), a target off block time (TOBT), a target taxi out time (TXOT), a target take off time (TTOT) for the aircraft 110 that is stored, generated, and/or provided by the mobile aviation turnaround device 120 and/or the onboard aviation turnaround device 180.

In some embodiments, the aviation turnaround interface component 500 is generated based on actual aviation turnaround data. In this regard, in some embodiments, the aviation turnaround interface component 500 includes one or more actual aviation turnaround display items. In some embodiments, an actual aviation turnaround display item is a display item that is representative of at least a portion of actual aviation turnaround data. For example, an actual aviation turnround display item may be representative of an actual start up approval time (ASAT), an actual off block time (AOBT), an actual taxi out time (AXOT), an actual take off time (ATOT) for the aircraft 110 that is stored, generated, and/or provided by the mobile aviation turnaround device 120 and/or the onboard aviation turnaround device 180.

In some embodiments, the aviation turnaround interface component 500 includes one or more turnaround update display items. In some embodiments, a turnaround update item display item is a display item that is representative of an update to an external aviation turnaround display item and/or an aircraft aviation turnaround display item. For example, a turnaround update display item may include an indication that a target start up approval time (TSAT), a target off block time (TOBT), a target taxi out time (TXOT), a target take off time (TTOT) has been changed (e.g., +10).

Figure 6:
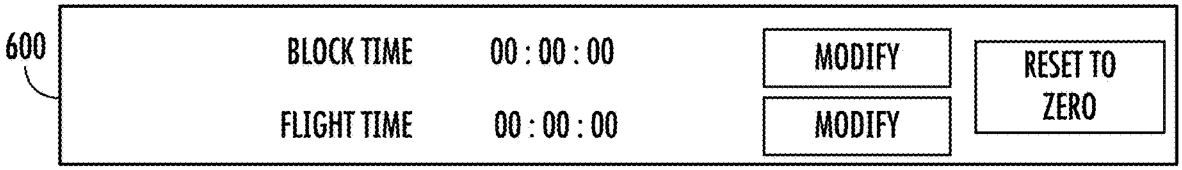
FIG. 6 illustrates an interface component in accordance with one or more embodiments of the present disclosure.

In some embodiments, the mobile aviation turnaround device 120 and/or the onboard aviation turnaround device 180 is configured to generate an operator designated time interface component 600, such as illustrated in FIG. 6. In some embodiments, the operator designated time interface component 600 is generated based on operator designated time data. In this regard, in some embodiments, the operator designated time interface component 600 includes one or more operator designated time display items. In some embodiments, an operator designated time display item is a display item that is representative of at least a portion of operator designated time data. For example, an operator designated time display item may be representative of a block time parameter designated by an operator of the aircraft 110. As another example, an operator designated time display item may be representative of a flight time parameter designated by an operator of the aircraft 110.

Figure 7:
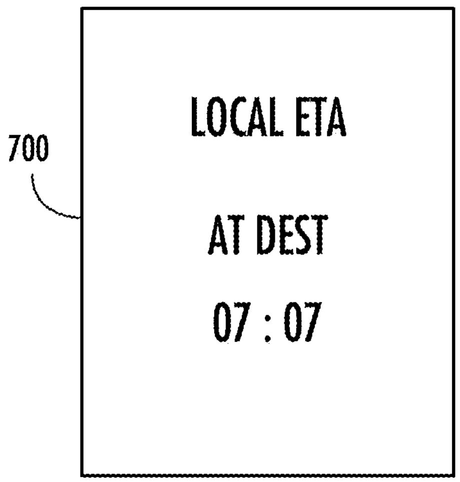
FIG. 7 illustrates an interface component in accordance with one or more embodiments of the present disclosure.

In some embodiments, the mobile aviation turnaround device 120 and/or the onboard aviation turnaround device 180 is configured to generate an aviation operations interface component 700, such as illustrated in FIG. 7. In some embodiments, the aviation operations interface component 700 is generated based on aviation operations data. In this regard, in some embodiments, the aviation operations interface component 700 includes one or more aviation operations display items. In some embodiments, an aviation operations display item is a display item that is representative of at least a portion of aviation operations data. For example, an aviation operations display item may be representative of a time of arrival at an airport (e.g., at a destination airport), a block time associated with an aircraft mission, a flight time associated with an aircraft mission, an altitude at various points in an aircraft mission, a speed at various points in an aircraft mission, fuel expenditure in an aircraft mission, a distance to go associated with an aircraft mission, a flight path associated with an aircraft mission, a flight plan associated with an aircraft mission.

In some embodiments, the aviation operations interface component 700 is generated based on revised aviation operations data. In this regard, in some embodiments, the aviation operations interface component 700 includes one or more revised aviation operations display items. In some embodiments, a revised aviation operations display item is a display item that is representative of at least a portion of revised aviation operations data. For example, a revised aviation operations display item may be representative of a revised time of arrival at an airport (e.g., at a destination airport), a revised block time associated with an aircraft mission, a revised flight time associated with an aircraft mission, a revised altitude at various points in an aircraft mission, a revised speed at various points in an aircraft mission, revised fuel expenditure in an aircraft mission, a revised distance to go associated with an aircraft mission, a revised flight path associated with an aircraft mission, a revised flight plan associated with an aircraft mission.

Figure 8:
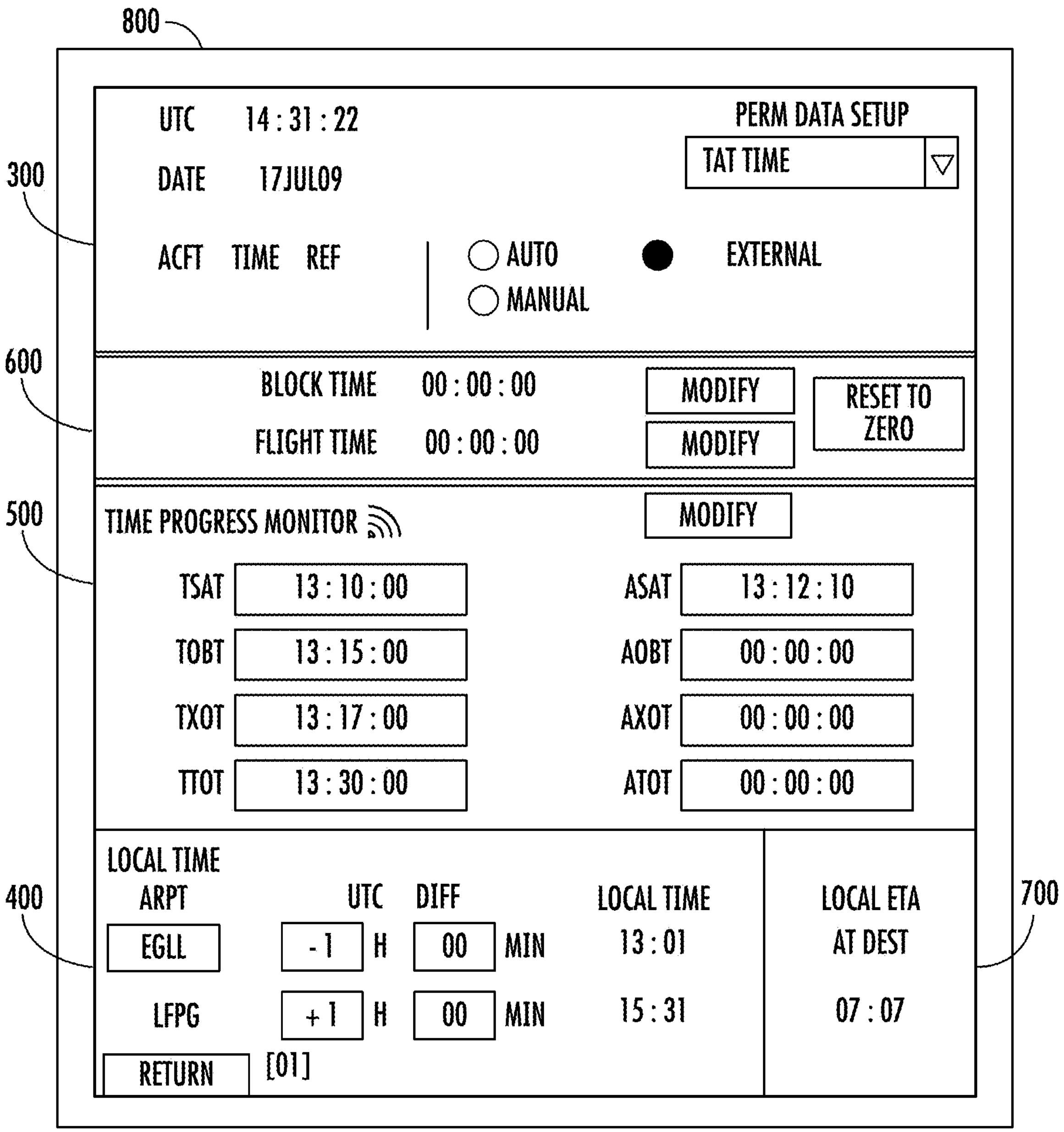
FIG. 8 illustrates an interface in accordance with one or more embodiments of the present disclosure.

In some embodiments, the mobile aviation turnaround device 120 and/or the onboard aviation turnaround device 180 is configured to cause the aircraft control interface component 300 to be rendered to an aviation interface 800, such as illustrated in FIG. 8. Additionally, or alternatively, the mobile aviation turnaround device 120 and/or the onboard aviation turnaround device 180 is configured to cause the airport interface component 400 to be rendered to an aviation interface 800, such as illustrated in FIG. 8. Additionally, or alternatively, the mobile aviation turnaround device 120 and/or the onboard aviation turnaround device 180 is configured to cause the aviation turnaround interface component 500 to be rendered to an aviation interface 800, such as illustrated in FIG. 8. Additionally, or alternatively, the mobile aviation turnaround device 120 and/or the onboard aviation turnaround device 180 is configured to cause the operator designated time interface component 600 to be rendered to an aviation interface 800, such as illustrated in FIG. 8. Additionally, or alternatively, the mobile aviation turnaround device 120 and/or the onboard aviation turnaround device 180 is configured to cause the aviation operations interface component 700 to be rendered to an aviation interface 800, such as illustrated in FIG. 8.

In some embodiments, the mobile aviation turnaround device 120 and/or the onboard aviation turnaround device 180 is configured to detect initiation of an aircraft mission associated with the aircraft 110. In this regard, for example, detecting initiation of an aircraft mission may include detecting performance of preflight procedures. As another example, detecting initiation of an aircraft mission may include detecting when the aircraft 110 leaves a gate (e.g., a gate at an originating airport). As another example, detecting initiation of an aircraft mission may include detecting may include detecting when the aircraft 110 is taxiing. In some embodiments, the mobile aviation turnaround device 120 and/or the onboard aviation turnaround device 180 is configured to disconnect from the external aviation turnaround device 140 in response to detecting the initiation of an aircraft mission by the aircraft 110.

In some embodiments, the mobile aviation turnaround device 120 and/or the onboard aviation turnaround device 180 is configured to initiate performance of one or more aviation related actions. In some embodiments, initiating performance of one or more aviation related actions is based on revised aviation operations data. In this regard, in some embodiments, initiating performance of one or more aviation related actions includes modifying the aviation operations interface component 700. For example, modifying the aviation operations interface component 700 may include replacing an aviation operations display item on the aviation operations interface component 700 with a revised aviation operations display item.

In some embodiments, initiating performance of one or more aviation related actions includes causing operation of at least one of the one or more aircraft components 130 of the aircraft 110. For example, the mobile aviation turnaround device 120 and/or the onboard aviation turnaround device 180 may be configured to cause operation of a multi-function control and display unit of the aircraft 110. In some embodiments, initiating performance of one or more aviation related actions includes causing initiation of an aircraft mission associated with the aircraft 110. For example, the mobile aviation turnaround device 120 and/or the onboard aviation turnaround device 180 may be configured to initiate an aircraft mission that factors in revised aviation operations data.

Example Methods

Figure 9:
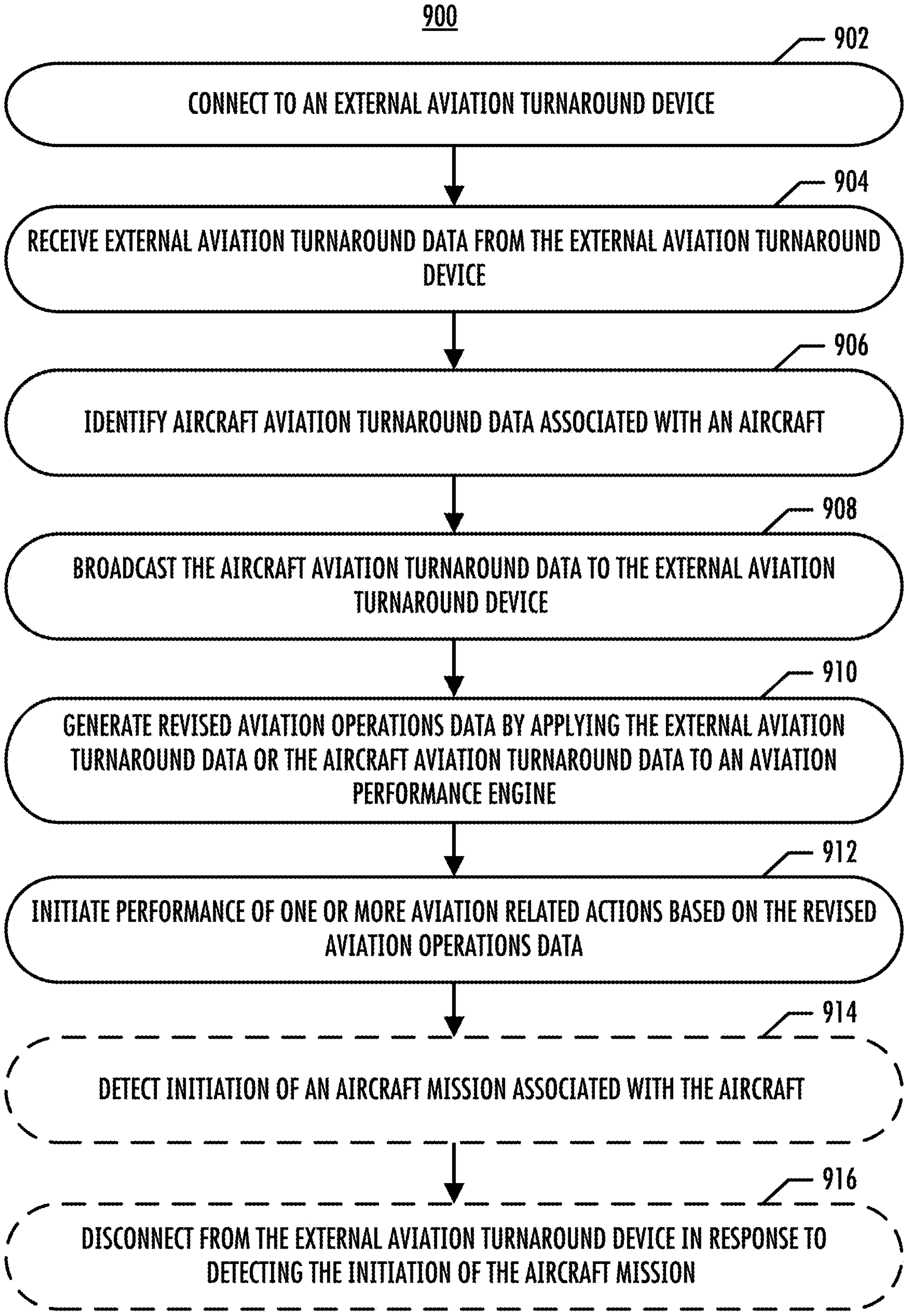
FIG. 9 illustrates a flowchart of an example method in accordance with one or more embodiments of the present disclosure.

Referring now to FIG. 9, a flowchart providing an example method 900 is illustrated. In this regard, FIG. 9 illustrates operations that may be performed by the remote aviation mission impact apparatus, the external aviation turnaround device 140, the mobile aviation turnaround device 120, the onboard aviation turnaround device 180, the aircraft secure interface device 190, the one or more aircraft components 130, the one or more aviation related data sources 160, and/or the one or more databases 170, and/or the like. In some embodiments, the method 900 includes operations for generating revised aviation operations data. In some embodiments, the example method 900 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 900.

As shown in block 902, the method 900 includes connecting to an external aviation turnaround device. As described above, in some embodiments, the mobile aviation turnaround device and/or the onboard aviation turnaround device is configured to connect to the external aviation turnaround device when the aircraft is at a gate at an airport. For example, the mobile aviation turnaround device and/or the onboard aviation turnaround device may be configured to connect to the external aviation turnaround device when the aircraft arrives at a gate after a flight (e.g., after an aircraft mission).

In some embodiments, connecting to the external aviation turnaround device is performed using a communication channel. In some embodiments, the communication channel is an electronic communication medium through which data may be transmitted. In some embodiments, the communication channel is a bidirectional communication channel. In this regard, for example, the communication channel enables the external aviation turnaround device, the mobile aviation turnaround device, and/or the onboard aviation turnaround device to send and receive data between each other. In some embodiments, using the communication channel to connect to the external aviation turnaround device is facilitated by the aircraft secure interface device. In this regard, for example, the communication channel may be a secure communication channel. In some embodiments, the aircraft secure interface device is configured to facilitate a handshake between the mobile aviation turnaround device and the external aviation turnaround device. Additionally, or alternatively, the aircraft secure interface device is configured to facilitate a handshake between the onboard aviation turnaround device and the external aviation turnaround device.

As shown in block 904, the method 900 includes receiving external aviation turnaround data from the external aviation turnaround device. As described above, in some embodiments, external aviation turnaround data is received in response to a query by the mobile aviation turnaround device and/or the onboard aviation turnaround device. In some embodiments, the mobile aviation turnaround device and/or the onboard aviation turnaround device is configured to query for external aviation turnaround data periodically. For example, the mobile aviation turnaround device and/or the onboard aviation turnaround device may be configured to query for external aviation turnaround data once a minute. In some embodiments, the mobile aviation turnaround device and/or the onboard aviation turnaround device is configured to receive external aviation turnaround data in real-time.

In some embodiments, external aviation turnaround data includes one or more items of data representative and/or indicative of a target turnaround process for the aircraft that is stored, generated, and/or provided by the one or more aviation related data sources and/or the external aviation turnaround device. For example, external aviation turnaround data may include one or more items of data representative and/or indicative of a target start up approval time (TSAT) for the aircraft that is stored, generated, and/or provided by the one or more aviation related data sources and/or the external aviation turnaround device. As another example, external aviation turnaround data may include one or more items of data representative and/or indicative of a target off block time (TOBT) for the aircraft that is stored, generated, and/or provided by the one or more aviation related data sources and/or the external aviation turnaround device.

As another example, external aviation turnaround data may include one or more items of data representative and/or indicative of a target taxi out time (TXOT) for the aircraft that is stored, generated, and/or provided by the one or more aviation related data sources and/or the external aviation turnaround device. As another example, external aviation turnaround data may include one or more items of data representative and/or indicative of a target take off time (TTOT) for the aircraft that is stored, generated, and/or provided by the one or more aviation related data sources and/or the external aviation turnaround device. Said differently, in some embodiments, external aviation turnaround data includes one or more items of data representative and/or indicative of the aircraft target out of gate time, the aircraft target wheels off the runway time, the aircraft target wheels on the runway time, and/or the aircraft target in the gate time (e.g., target OOOI data associated with the aircraft) that is stored, generated, and/or provided by the one or more aviation related data sources and/or the external aviation turnaround device.

As shown in block 906, the method 900 includes identifying aircraft aviation turnaround data associated with an aircraft. As described above, in some embodiments, aircraft aviation turnaround data includes one or more items of data representative and/or indicative of a target turnaround process for the aircraft that is stored, generated, and/or provided by one or more devices by the mobile aviation turnaround device and/or the onboard aviation turnaround device. For example, aircraft aviation turnaround data may include one or more items of data representative and/or indicative of a target start up approval time (TSAT) for the aircraft that is stored, generated, and/or provided by the mobile aviation turnaround device and/or the onboard aviation turnaround device. As another example, aircraft aviation turnaround data may include one or more items of data representative and/or indicative of a target off block time (TOBT) for the aircraft that is stored, generated, and/or provided by the mobile aviation turnaround device and/or the onboard aviation turnaround device.

As another example, aircraft aviation turnaround data may include one or more items of data representative and/or indicative of a target taxi out time (TXOT) for the aircraft that is stored, generated, and/or provided by the mobile aviation turnaround device and/or the onboard aviation turnaround device. As another example, aircraft aviation turnaround data may include one or more items of data representative and/or indicative of a target take off time (TTOT) for the aircraft that is stored, generated, and/or provided by the mobile aviation turnaround device and/or the onboard aviation turnaround device. Said differently, in some embodiments, aircraft aviation turnaround data includes one or more items of data representative and/or indicative of the aircraft target out of gate time, the aircraft target wheels off the runway time, the aircraft target wheels on the runway time, and/or the aircraft target in the gate time (e.g., target OOOI data associated with the aircraft) that is stored, generated, and/or provided by the mobile aviation turnaround device and/or the onboard aviation turnaround device.

In some embodiments, identifying aircraft aviation turnaround data includes the mobile aviation turnaround device and/or the onboard aviation turnaround device being configured to receive aircraft aviation turnaround data via an aviation turnaround interface component. For example, a pilot associated with the aircraft may provide aircraft aviation turnaround data to the mobile aviation turnaround device and/or the onboard aviation turnaround device via the aviation turnaround interface component. In some embodiments, identifying aircraft aviation turnaround data includes the mobile aviation turnaround device and/or the onboard aviation turnaround device being configured to generate aircraft aviation turnaround data. In some embodiments, the mobile aviation turnaround device and/or the onboard aviation turnaround device is configured to generate aircraft aviation turnaround data using at least one of the one or more aircraft components. For example, the mobile aviation turnaround device and/or the onboard aviation turnaround device may be configured to generate aircraft aviation turnaround data using an inertial reference system, radar, actuators, global positioning systems, and/or the like.

As shown in block 908, the method 900 includes broadcasting the aircraft aviation turnaround data to the external aviation turnaround device. As described above, in some embodiments, the mobile aviation turnaround device and/or the onboard aviation turnaround device is configured to broadcast aircraft aviation turnaround data using the communication channel. In some embodiments, the aircraft secure interface device is configured to facilitate broadcasting of aircraft aviation turnaround data by the mobile aviation turnaround device and/or the onboard aviation turnaround device. In some embodiments, the mobile aviation turnaround device and/or the onboard aviation turnaround device is configured to broadcast aircraft aviation turnaround data when at an airport (e.g., at a gate of the airport). For example, the mobile aviation turnaround device and/or the onboard aviation turnaround device may be configured to broadcast aircraft aviation turnaround data after the aircraft has completed a flight and is preparing for another flight (e.g., after an aircraft has completed an aircraft mission and is preparing for another aircraft mission). In some embodiments, the mobile aviation turnaround device and/or the onboard aviation turnaround device is configured to broadcast aircraft aviation turnaround data in real-time.

As shown in block 910, the method 900 includes generating revised aviation operations data by applying the external aviation turnaround data or the aircraft aviation turnaround data to an aviation performance engine. As described above, in some embodiments, revised aviation operations data includes one or more items of data representative and/or indicative of one or more revised predicted parameters associated with an aircraft mission. For example, revised aviation operations data may include one or more items of data representative and/or indicative of a revised time of arrival at an airport (e.g., at a destination airport). As another example, revised aviation operations data may include one or more items of data representative and/or indicative of a revised block time associated with an aircraft mission. As another example, revised aviation operations data may include one or more items of data representative and/or indicative of a revised flight time associated with an aircraft mission. As another example, revised aviation operations data may include one or more items of data representative and/or indicative of a revised altitude at various points in an aircraft mission.

As another example, revised aviation operations data may include one or more items of data representative and/or indicative of a revised speed at various points in an aircraft mission. As another example, revised aviation operations data may include one or more items of data representative and/or indicative of a revised fuel expenditure in an aircraft mission. As another example, revised aviation operations data may include one or more items of data representative and/or indicative of a revised distance to go associated with an aircraft mission. As another example, revised aviation operations data may include one or more items of data representative and/or indicative of a revised flight path associated with an aircraft mission. As another example, revised aviation operations data may include one or more items of data representative and/or indicative of a revised flight plan associated with an aircraft mission.

In some embodiments, the aviation performance engine is a data entity that describes parameters, hyper-parameters, and/or defined operations of a rules-based and/or machine learning model that is configured to generate revised aviation operations data. In some embodiments, if external aviation turnaround data indicates that a target start up approval time (TSAT) is later and/or earlier than a previous target start up approval time (TSAT), applying the external aviation turnaround data to the aviation performance engine may generate revised aviation operations data that factors in the change to the target start up approval time (TSAT). For example, revised aviation operation data may include a revised time of arrival at an airport (e.g., at a destination airport) due to the change to the target start up approval time (TSAT). In some embodiments, if external aviation turnaround data indicates that a target off block time (TOBT) is later and/or earlier than a previous target off block time (TOBT), applying the external aviation turnaround data to the aviation performance engine may generate revised aviation operations data that factors in the change to the target off block time (TOBT). For example, revised aviation operation data may include a revised fuel expenditure due to the change to the target off block time (TOBT).

In some embodiments, if external aviation turnaround data indicates that a target taxi out time (TXOT) is later and/or earlier than a previous target taxi out time (TXOT), applying the external aviation turnaround data to the aviation performance engine may generate revised aviation operations data that factors in the change to the target taxi out time (TXOT). For example, revised aviation operation data may include a revised flight path due to the change to the target taxi out time (TXOT). In some embodiments, if external aviation turnaround data indicates that a target take off time (TTOT) is later and/or earlier than a previous target take off time (TTOT), applying the external aviation turnaround data to the aviation performance engine may generate revised aviation operations data that factors in the change to the target take off time (TTOT). For example, revised aviation operation data may include a revised altitude at various points in an aircraft mission in due to the change to the target take off time (TTOT).

Additionally, or alternatively, in some embodiments, the mobile aviation turnaround device and/or the onboard aviation turnaround device is configured to generate revised aviation operations data by applying aircraft aviation turnaround data to an aviation performance engine. In this regard, in some embodiments, if aircraft aviation turnaround data indicates that a target start up approval time (TSAT) is later and/or earlier than a previous target start up approval time (TSAT), applying the aircraft aviation turnaround data to the aviation performance engine may generate revised aviation operations data that factors in the change to the target start up approval time (TSAT). For example, revised aviation operation data may include a revised time of arrival at an airport (e.g., at a destination airport) due to the change to the target start up approval time (TSAT). In some embodiments, if aircraft aviation turnaround data indicates that a target off block time (TOBT) is later and/or earlier than a previous target off block time (TOBT), applying the aircraft aviation turnaround data to the aviation performance engine may generate revised aviation operations data that factors in the change to the target off block time (TOBT). For example, revised aviation operation data may include a revised fuel expenditure due to the change to the target off block time (TOBT).

In some embodiments, if aircraft aviation turnaround data indicates that a target taxi out time (TXOT) is later and/or earlier than a previous target taxi out time (TXOT), applying the aircraft aviation turnaround data to the aviation performance engine may generate revised aviation operations data that factors in the change to the target taxi out time (TXOT). For example, revised aviation operation data may include a revised flight path due to the change to the target taxi out time (TXOT). In some embodiments, if aircraft aviation turnaround data indicates that a target take off time (TTOT) is later and/or earlier than a previous target take off time (TTOT), applying the aircraft aviation turnaround data to the aviation performance engine may generate revised aviation operations data that factors in the change to the target take off time (TTOT). For example, revised aviation operation data may include a revised altitude at various points in an aircraft mission in due to the change to the target take off time (TTOT).

As shown in block 912, the method 900 includes initiating performance of one or more aviation related actions based on the revised aviation operations data. As shown in optional block 914, the method 900 optionally includes detecting initiation of an aircraft mission associated with the aircraft. As described above, in some embodiments, an aircraft mission is a defined series of operations performed by the aircraft. For example, may include a defined series of operations performed by the aircraft to move from a first airport to a second airport. In this regard, in some embodiments, an aircraft mission may include a defined series of operations performed by the aircraft that include operations performed while the aircraft is performing preflight procedures, (e.g., at the gate before a flight), leaving a gate, taxiing, taking off, in flight, landing, parking at a gate performing post flight procedures (e.g., at the gate after a flight), and/or the like. For example, an aircraft mission may include a defined series of operations that includes leaving the gate at a first airport, taxiing to a runway at the first airport (e.g., an originating airport), taking off from the first airport, flying to a second airport (e.g., a destination airport), landing at the second airport, taxiing to a gate at the second airport, parking at a gate at the second airport.

In some embodiments, for example, detecting initiation of an aircraft mission may include detecting performance of preflight procedures. As another example, detecting initiation of an aircraft mission may include detecting when the aircraft leaves a gate (e.g., a gate at an originating airport). As another example, detecting initiation of an aircraft mission may include detecting may include detecting when the aircraft is taxiing.

As shown in optional block 916, the method 900 optionally includes disconnecting from the external aviation turnaround device in response to detecting the initiation of the aircraft mission. For example, the mobile aviation turnaround device and/or the onboard aviation turnaround device may disconnect from the external aviation turnaround device so the aircraft may perform the aircraft mission.

Figure 10:
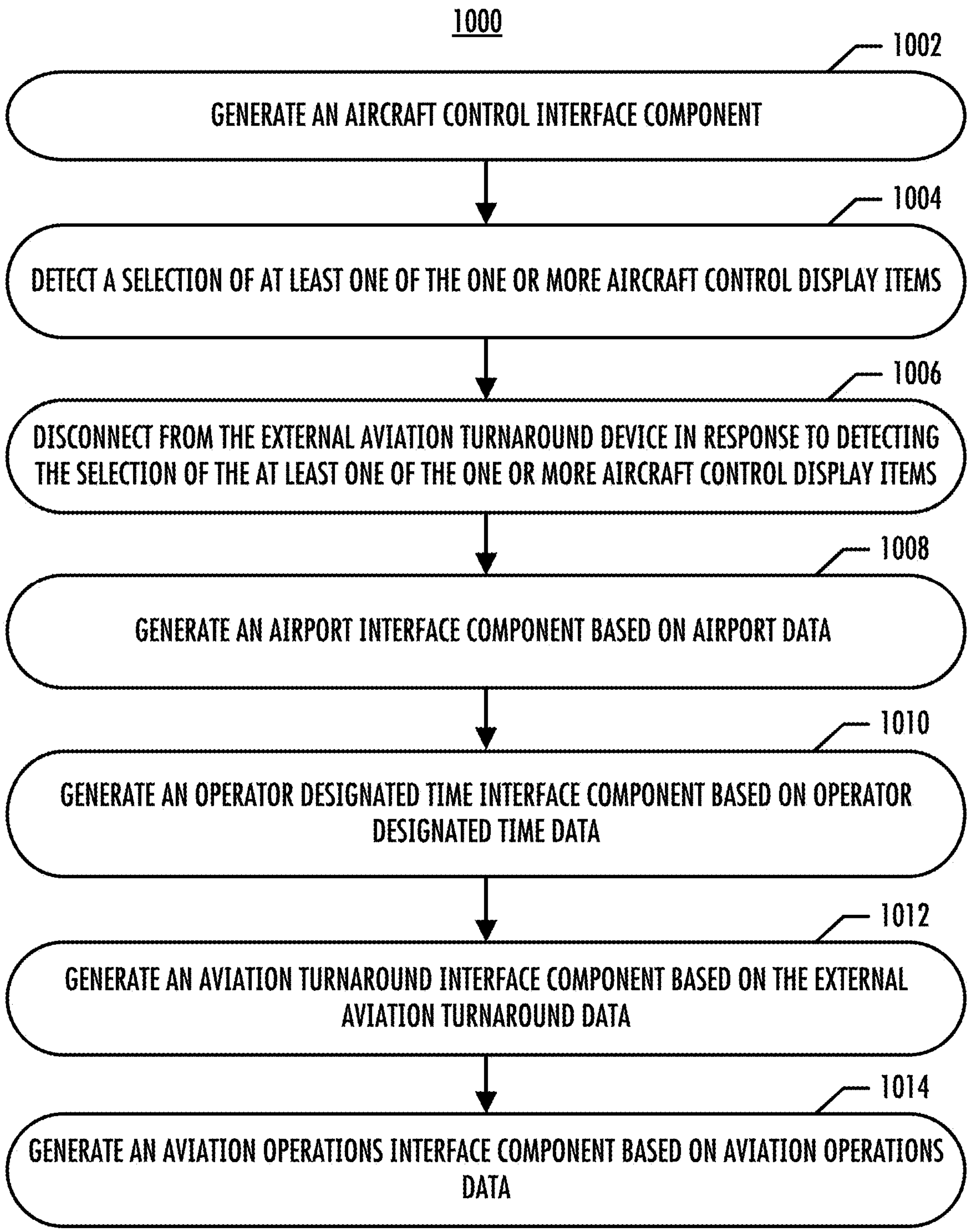
FIG. 10 illustrates a flowchart of an example method in accordance with one or more embodiments of the present disclosure.

Referring now to FIG. 10, a flowchart providing an example method 1000 is illustrated. In this regard, FIG. 10 illustrates operations that may be performed by the remote aviation mission impact apparatus, the external aviation turnaround device 140, the mobile aviation turnaround device 120, the onboard aviation turnaround device 180, the aircraft secure interface device 190, the one or more aircraft components 130, the one or more aviation related data sources 160, and/or the one or more databases 170, and/or the like. In some embodiments, the method 1000 includes operations for generating one or more interface components. In some embodiments, the example method 1000 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 1000.

As shown in block 1002, the method 1000 includes generating an aircraft control interface component. As described above, in some embodiments, the aircraft control interface component includes one or more aircraft control display items. In some embodiments, an aircraft control display item is a display item that may be used to control one or more operations of the aircraft. For example, the aircraft control interface component may include an aircraft control display item that is configured for automatically setting a time associated with the aircraft when selected. As another example, the aircraft control interface component may include an aircraft control display item that is configured to be used for manually setting a time associated with the aircraft when selected (e.g., by an operator of the aircraft). As another example, the aircraft control interface component may include an aircraft control display item that is configured for connecting and/or disconnecting from the external aviation turnaround device (e.g., an aircraft control display item named external).

As shown in block 1004, the method 1000 includes detecting a selection of at least one of the one or more aircraft control display items. As shown in block 1006, the method 1000 includes disconnecting from the external aviation turnaround device in response to detecting the selection of the at least one of the one or more aircraft control display items. As described above, in some embodiments, at least one of the one or more aircraft control display items is visually distinguished on the aircraft control interface component when the mobile aviation turnaround device and/or the onboard aviation turnaround device is connected to the external aviation turnaround device. For example, at least one of the one or more aircraft control display items may be visually distinguished on the aircraft control interface component using text, markings, colors, highlights, and/or the like (e.g., an aircraft control display item is green).

As shown in block 1008, the method 1000 includes generating an airport interface component based on airport data. As described above, in some embodiments, airport data includes one or more items of data representative and/or indicative of an airport associated with the aircraft (e.g., an airport the aircraft is located at, traveling to, etc.). For example, airport data may include one or more items of data representative and/or indicative of a name of an airport associated with the aircraft. As another example, airport data may include one or more items of data representative and/or indicative of an airport code of an airport associated with the aircraft (e.g., LFPG). As another example, airport data may include one or more items of data representative and/or indicative of a time at an airport associated with the aircraft (e.g., 10:00). As another example, airport data may include one or more items of data representative and/or indicative of a time at an airport associated with the aircraft relative to a standard time (e.g., UTC minus one hour). As another example, airport data may include one or more items of data representative and/or indicative of a gate designated for the aircraft at an airport associated with the aircraft.

In some embodiments, identifying airport data includes the mobile aviation turnaround device and/or the onboard aviation turnaround device being configured to receive airport data from the external aviation turnaround device. For example, the external aviation turnaround device may be configured to determine a gate designated for the aircraft at an airport associated with the aircraft provide information about the gate to the mobile aviation turnaround device and/or the onboard aviation turnaround device. In some embodiments, identifying airport data includes the mobile aviation turnaround device and/or the onboard aviation turnaround device being configured to generate airport data. In some embodiments, the mobile aviation turnaround device and/or the onboard aviation turnaround device is configured to generate airport data using at least one of the one or more aircraft components. For example, the mobile aviation turnaround device and/or the onboard aviation turnaround device may be configured to determine a time at an airport associated with the aircraft using the one or more aircraft components.

In some embodiments, the airport interface component is generated based on airport data. In this regard, in some embodiments, the airport interface component includes one or more airport display items. In some embodiments, an airport display item is a display item that is representative of at least a portion of airport data. For example, an airport display item may be representative of an airport associated with the aircraft, an airport code of an airport associated with the aircraft, a time at an airport associated with the aircraft, a time at an airport associated with the aircraft relative to a standard time, and/or a gate designated for the aircraft at an airport associated with the aircraft.

As shown in block 1010, the method 1000 includes generating an operator designated time interface component based on operator designated time data. As described above, in some embodiments, the mobile aviation turnaround device and/or the onboard aviation turnaround device is configured to receive operator designated time data. In some embodiments, the mobile aviation turnaround device and/or the onboard aviation turnaround device is configured to receive operator designated time data via an operator designated time interface component. In some embodiments, operator designated time data includes one or more items of data representative and/or indicative of one or more time parameters designated by an operator of the aircraft (e.g., one or more time values designated by a pilot of the aircraft). For example, operator designated time data may include one or more items of data representative and/or indicative of a block time parameter designated by an operator of the aircraft. As another example, operator designated time data may include one or more items of data representative and/or indicative of a flight time parameter designated by an operator of the aircraft.

In some embodiments, the operator designated time interface component is generated based on operator designated time data. In this regard, in some embodiments, the operator designated time interface component includes one or more operator designated time display items. In some embodiments, an operator designated time display item is a display item that is representative of at least a portion of operator designated time data. For example, an operator designated time display item may be representative of a block time parameter designated by an operator of the aircraft. As another example, an operator designated time display item may be representative of a flight time parameter designated by an operator of the aircraft.

As shown in block 1012, the method 1000 includes generating an aviation turnaround interface component based on the external aviation turnaround data, the aircraft aviation turnaround data, or actual aviation turnaround data. As described above, in some embodiments, the aviation turnaround interface component is generated based on external aviation turnaround data. In this regard, in some embodiments, the aviation turnaround interface component includes one or more external aviation turnaround display items. In some embodiments, an external aviation turnaround display item is a display item that is representative of at least a portion of external aviation turnaround data. For example, an external aviation turnround display item may be representative of a target start up approval time (TSAT), a target off block time (TOBT), a target taxi out time (TXOT), a target take off time (TTOT) for the aircraft that is stored, generated, and/or provided by the one or more aviation related data sources and/or the external aviation turnaround device.

In some embodiments, the aviation turnaround interface component is generated based on aircraft aviation turnaround data. In this regard, in some embodiments, the aviation turnaround interface component includes one or more aircraft aviation turnaround display items. In some embodiments, an aircraft aviation turnaround display item is a display item that is representative of at least a portion of aircraft aviation turnaround data. For example, an aircraft aviation turnround display item may be representative of a target start up approval time (TSAT), a target off block time (TOBT), a target taxi out time (TXOT), a target take off time (TTOT) for the aircraft that is stored, generated, and/or provided by the mobile aviation turnaround device and/or the onboard aviation turnaround device.

In some embodiments, the aviation turnaround interface component is generated based on actual aviation turnaround data. In this regard, in some embodiments, the aviation turnaround interface component includes one or more actual aviation turnaround display items. In some embodiments, an actual aviation turnaround display item is a display item that is representative of at least a portion of actual aviation turnaround data. For example, an actual aviation turnround display item may be representative of an actual start up approval time (ASAT), an actual off block time (AOBT), an actual taxi out time (AXOT), an actual take off time (ATOT) for the aircraft that is stored, generated, and/or provided by the mobile aviation turnaround device and/or the onboard aviation turnaround device.

In some embodiments, the aviation turnaround interface component includes one or more turnaround update display items. In some embodiments, a turnaround update item display item is a display item that is representative of an update to an external aviation turnaround display item and/or an aircraft aviation turnaround display item. For example, a turnaround update display item may include an indication that a target start up approval time (TSAT), a target off block time (TOBT), a target taxi out time (TXOT), a target take off time (TTOT) has been changed (e.g., +10).

As shown in block 1014, the method 1000 includes generating an aviation operations interface component based on aviation operations data. As described above, in some embodiments, the aviation operations interface component is generated based on aviation operations data. In this regard, in some embodiments, the aviation operations interface component includes one or more aviation operations display items. In some embodiments, an aviation operations display item is a display item that is representative of at least a portion of aviation operations data. For example, an aviation operations display item may be representative of a time of arrival at an airport (e.g., at a destination airport), a block time associated with an aircraft mission, a flight time associated with an aircraft mission, an altitude at various points in an aircraft mission, a speed at various points in an aircraft mission, fuel expenditure in an aircraft mission, a distance to go associated with an aircraft mission, a flight path associated with an aircraft mission, a flight plan associated with an aircraft mission.

In some embodiments, the aviation operations interface component is generated based on revised aviation operations data. In this regard, in some embodiments, the aviation operations interface component includes one or more revised aviation operations display items. In some embodiments, a revised aviation operations display item is a display item that is representative of at least a portion of revised aviation operations data. For example, a revised aviation operations display item may be representative of a revised time of arrival at an airport (e.g., at a destination airport), a revised block time associated with an aircraft mission, a revised flight time associated with an aircraft mission, a revised altitude at various points in an aircraft mission, a revised speed at various points in an aircraft mission, revised fuel expenditure in an aircraft mission, a revised distance to go associated with an aircraft mission, a revised flight path associated with an aircraft mission, a revised flight plan associated with an aircraft mission.

Figure 11:
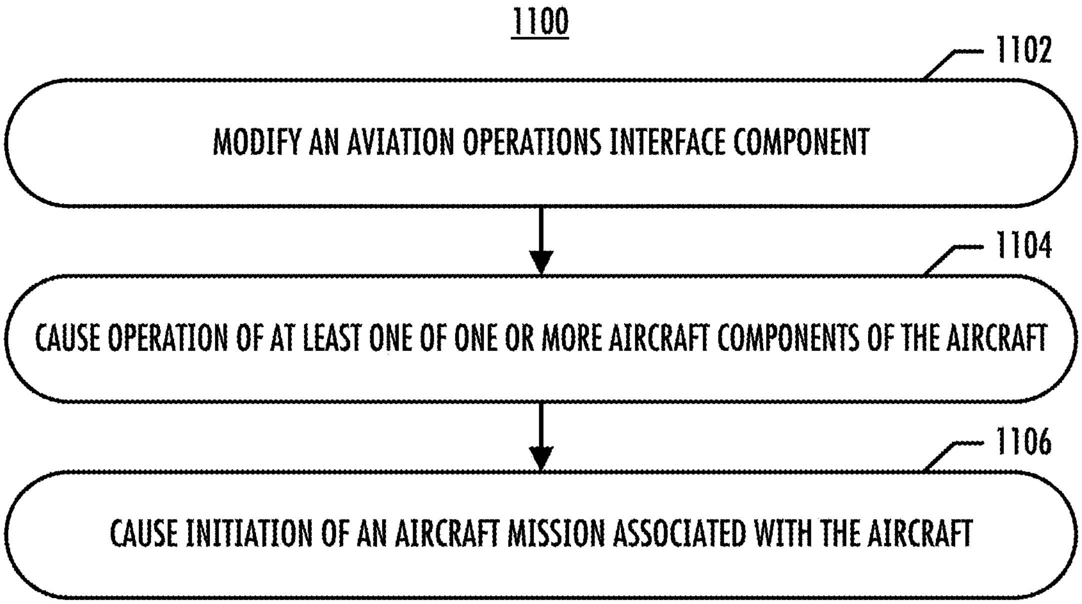
FIG. 11 illustrates a flowchart of an example method in accordance with one or more embodiments of the present disclosure.

Referring now to FIG. 11, a flowchart providing an example method 1100 is illustrated. In this regard, FIG. 11 illustrates operations that may be performed by the remote aviation mission impact apparatus, the external aviation turnaround device 140, the mobile aviation turnaround device 120, the onboard aviation turnaround device 180, the aircraft secure interface device 190, the one or more aircraft components 130, the one or more aviation related data sources 160, and/or the one or more databases 170, and/or the like. In some embodiments, the method 1100 includes operations for initiating performance of one or more aviation related actions. In some embodiments, the example method 1100 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 1100.

As shown in block 1102, the method 1100 includes modifying an aviation operations interface component. As described above, in some embodiments, initiating performance of one or more aviation related actions is based on revised aviation operations data. For example, modifying the aviation operations interface component may include replacing an aviation operations display item on the aviation operations interface component with a revised aviation operations display item.

As shown in block 1104, the method 1100 includes causing operation of at least one of one or more aircraft components of the aircraft. As described above, in some embodiments, initiating performance of one or more aviation related actions is based on revised aviation operations data. For example, the mobile aviation turnaround device and/or the onboard aviation turnaround device may be configured to cause operation of a multi-function control and display unit of the aircraft.

As shown in block 1106, the method 1100 includes causing initiation of an aircraft mission associated with the aircraft. As described above, in some embodiments, initiating performance of one or more aviation related actions is based on revised aviation operations data. For example, the mobile aviation turnaround device and/or the onboard aviation turnaround device may be configured to initiate an aircraft mission that factors in revised aviation operations data.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

The invention claimed is:

1. A method comprising:

connecting to an external aviation turnaround device;

receiving external aviation turnaround data from the external aviation turnaround device;

identifying aircraft aviation turnaround data associated with an aircraft;

broadcasting the aircraft aviation turnaround data to the external aviation turnaround device;

detecting deviations in one or more turnaround time parameters between previously determined turnaround time values and updated turnaround time values included in the external aviation turnaround data or the aircraft aviation turnaround data;

generating revised aviation operations data by applying the detected deviations in the one or more turnaround time parameters to an aviation performance engine; and initiating performance of one or more aviation related actions based on the revised aviation operations data.

2. The method of claim 1, wherein the external aviation turnaround device is configured to access the external aviation turnaround data from one or more aviation related data sources physically located at an airport.

3. The method of claim 1, wherein connecting to the external aviation turnaround device is performed using a bidirectional communication channel.

4. The method of claim 1, wherein the aircraft aviation turnaround data is broadcast using an aircraft secure interface device.

5. The method of claim 1, further comprising:

detecting initiation of an aircraft mission associated with the aircraft; and disconnecting from the external aviation turnaround device in response to detecting the initiation of the aircraft mission.

6. The method of claim 1, wherein the external aviation turnaround data is received in real-time and the aircraft aviation turnaround data is broadcast in real-time.

7. The method of claim 1, further comprising:

generating an aircraft control interface component, wherein the aircraft control interface component comprises one or more aircraft control display items.

8. The method of claim 7, further comprising:

detecting a selection of at least one of the one or more aircraft control display items; and disconnecting from the external aviation turnaround device in response to detecting the selection of the at least one of the one or more aircraft control display items.

9. The method of claim 1, further comprising:

generating an airport interface component based on airport data, wherein the airport interface component comprises one or more airport display items.

10. The method of claim 1, further comprising:

generating an operator designated time interface component based on operator designated time data, wherein the operator designated time interface component comprises one or more operator designated time display items.

11. The method of claim 1, further comprising:

generating an aviation turnaround interface component based on the external aviation turnaround data, the aircraft aviation turnaround data, or actual aviation turnaround data, wherein the aviation turnaround interface component comprises one or more external aviation turnaround display items, aircraft aviation turnaround display items, or actual aviation turnaround display items.

12. The method of claim 1, further comprising:

generating an aviation operations interface component based on aviation operations data, wherein the aviation operations interface component comprises one or more aviation operations display items.

13. The method of claim 1, wherein initiating performance of the one or more aviation related actions comprises:

modifying an aviation operations interface component.

14. The method of claim 1, wherein initiating performance of the one or more aviation related actions comprises:

causing operation of at least one of one or more aircraft components of the aircraft.

15. The method of claim 1, wherein initiating performance of the one or more aviation related actions comprises:

causing initiation of an aircraft mission associated with the aircraft.

16. An apparatus comprising memory and one or more processors communicatively coupled to the memory, the one or more processors configured to:

connect to an external aviation turnaround device;

receive external aviation turnaround data from the external aviation turnaround device;

identify aircraft aviation turnaround data associated with an aircraft;

broadcast the aircraft aviation turnaround data to the external aviation turnaround device;

detect deviations in one or more turnaround time parameters between previously determined turnaround time values and updated turnaround time values included in the external aviation turnaround data or the aircraft aviation turnaround data;

generate revised aviation operations data by applying the detected deviations in the one or more turnaround time parameters to an aviation performance engine; and initiate performance of one or more aviation related actions based on the revised aviation operations data.

17. The apparatus of claim 16, wherein the external aviation turnaround device is configured to access the external aviation turnaround data from one or more aviation related data sources physically located at an airport.

18. The apparatus of claim 16, wherein the one or more processors are further configured to:

detect initiation of an aircraft mission associated with the aircraft; and disconnect from the external aviation turnaround device in response to detecting the initiation of the aircraft mission.

19. The apparatus of claim 16, wherein the external aviation turnaround data is received in real-time and the aircraft aviation turnaround data is broadcast in real-time.

20. A computer program product comprising at least one non-transitory computer-readable storage medium having computer program code stored thereon that, in execution with at least one processor, configures the computer program product for:

connecting to an external aviation turnaround device;

receiving external aviation turnaround data from the external aviation turnaround device;

identifying aircraft aviation turnaround data associated with an aircraft;

broadcasting the aircraft aviation turnaround data to the external aviation turnaround device;

detecting deviations in one or more turnaround time parameters between previously determined turnaround time values and updated turnaround time values included in the external aviation turnaround data or the aircraft aviation turnaround data;

generating revised aviation operations data by applying the detected deviations in the one or more turnaround time parameters to an aviation performance engine; and initiating performance of one or more aviation related actions based on the revised aviation operations data.

* * * * *